(12) United States Patent
Aoki et al.

(10) Patent No.: US 9,131,171 B2
(45) Date of Patent: Sep. 8, 2015

(54) IMAGE SENSOR, CAMERA, SURVEILLANCE SYSTEM, AND METHOD FOR DRIVING THE IMAGE SENSOR

(71) Applicant: Semiconductor Energy Laboratory Co., Ltd., Atsugi-shi, Kanagawa-ken (JP)

(72) Inventors: Takeshi Aoki, Atsugi (JP); Takayuki Ikeda, Atsugi (JP); Yurika Sato, Hiratsuka (JP); Koji Dairiki, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 371 days.

(21) Appl. No.: 13/772,663

(22) Filed: Feb. 21, 2013

(65) Prior Publication Data
US 2013/0222584 A1  Aug. 29, 2013

(30) Foreign Application Priority Data

Feb. 29, 2012  (JP) .................................. 2012-042657

(51) Int. Cl.
*H04N 5/335* (2011.01)
*H04N 5/374* (2011.01)
(Continued)

(52) U.S. Cl.
CPC ........... *H04N 5/335* (2013.01); *H04N 5/23254* (2013.01); *H04N 5/378* (2013.01); *H04N 7/18* (2013.01)

(58) Field of Classification Search
CPC ... H04N 5/378; H04N 5/37455; H04N 5/335; H04N 5/374; H03M 1/56; H03M 1/123; H03M 1/34; H03M 1/0658; H03M 1/129
See application file for complete search history.

(56) References Cited

U.S. PATENT DOCUMENTS

| 5,528,032 A | 6/1996 | Uchiyama |
| 5,705,807 A | 1/1998 | Throngnumchai |

(Continued)

FOREIGN PATENT DOCUMENTS

| EP | 1737044 A | 12/2006 |
| EP | 2226847 A | 9/2010 |

(Continued)

OTHER PUBLICATIONS

Muramatsu.Y et al., "A signal-processing CMOS image sensor using a simple analog operation", IEEE Journal of Solid-State Circuits, 2003, vol. 38, No. 1, pp. 101-106.

(Continued)

*Primary Examiner* — Roberto Velez
*Assistant Examiner* — Tuan Le
(74) *Attorney, Agent, or Firm* — Eric J. Robinson; Robinson Intellectual Property Law Office, P.C.

(57) ABSTRACT

Provided is an image sensor having a pixel includes a photoelectric conversion element; a capacitor which is connected between the photoelectric conversion element; a reset circuit which resets a potential of a node between the photoelectric conversion element and the capacitor; an amplifier circuit which outputs a signal corresponding to the potential of the node; and a switch which controls electrical conduction between the amplifier circuit and a vertical signal line. When the node is brought into an electrically floating state, the potential of the optical signal is stored in the node in a state of being inverted. When an optical signal is detected while the potential is stored in the node, the potential of the node increases in accordance with an output potential of the photoelectric conversion element, and thus the potential of the node corresponds to a difference in potential between the optical signals in different light-receiving periods.

19 Claims, 10 Drawing Sheets

(51) Int. Cl.
*H04N 5/378* (2011.01)
*H04N 5/232* (2006.01)
*H04N 7/18* (2006.01)

(56) References Cited

U.S. PATENT DOCUMENTS

| | | |
|---|---|---|
| 5,731,856 A | 3/1998 | Kim et al. |
| 5,744,864 A | 4/1998 | Cillessen et al. |
| 6,294,274 B1 | 9/2001 | Kawazoe et al. |
| 6,563,174 B2 | 5/2003 | Kawasaki et al. |
| 6,576,882 B2 | 6/2003 | Muramatsu et al. |
| 6,727,522 B1 | 4/2004 | Kawasaki et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al. |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,623,173 B2 | 11/2009 | Nitta et al. |
| 7,674,650 B2 | 3/2010 | Akimoto et al. |
| 7,732,819 B2 | 6/2010 | Akimoto et al. |
| 8,259,206 B1 * | 9/2012 | Shibata et al. ............... 348/308 |
| 8,576,317 B2 | 11/2013 | Sakakibara et al. |
| 2001/0046027 A1 | 11/2001 | Tai et al. |
| 2002/0000508 A1 | 1/2002 | Muramatsu et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0127038 A1 | 7/2004 | Carcia et al. |
| 2004/0239695 A1 * | 12/2004 | Tobita et al. ............... 345/690 |
| 2005/0017302 A1 | 1/2005 | Hoffman |
| 2005/0195304 A1 * | 9/2005 | Nitta et al. ............... 348/308 |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0176205 A1 * | 8/2006 | Kawahito ............... 341/155 |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0284999 A1 * | 12/2006 | Muramatsu et al. ............ 348/308 |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0049128 A1 | 2/2008 | Murata et al. |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0111905 A1 * | 5/2008 | Toyama et al. ............... 348/308 |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0198049 A1 * | 8/2008 | Maruyama ............... 341/122 |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0101948 A1 | 4/2009 | Park et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092809 A1 | 4/2010 | Itagaki et al. |
| 2010/0109002 A1 | 5/2010 | Itagaki et al. |
| 2010/0134735 A1 | 6/2010 | Nakamura et al. |
| 2010/0141500 A1 * | 6/2010 | Kawaguchi et al. .......... 341/172 |
| 2010/0321547 A1 * | 12/2010 | Morikawa et al. ............ 348/294 |
| 2011/0001039 A1 * | 1/2011 | Hoshino ............... 250/208.1 |
| 2011/0074994 A1 * | 3/2011 | Wakabayashi et al. ....... 348/302 |
| 2011/0109592 A1 | 5/2011 | Kurokawa et al. |
| 2011/0176038 A1 | 7/2011 | Kurokawa et al. |
| 2011/0198483 A1 | 8/2011 | Kurokawa |
| 2011/0215323 A1 | 9/2011 | Kurokawa et al. |
| 2011/0220889 A1 | 9/2011 | Kurokawa et al. |
| 2011/0221723 A1 | 9/2011 | Kurokawa et al. |
| 2011/0254986 A1 * | 10/2011 | Nishimura et al. ............ 348/302 |
| 2012/0002090 A1 | 1/2012 | Aoki et al. |
| 2012/0037972 A1 | 2/2012 | Yoneda |
| 2013/0016035 A1 | 1/2013 | Ikeda |
| 2014/0036123 A1 | 2/2014 | Sakakibara et al. |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 06-275697 | 9/1994 |
| JP | 08-122149 A | 5/1996 |
| JP | 08-223490 | 8/1996 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-077737 | 3/2002 |
| JP | 2002-289859 A | 10/2002 |
| JP | 2003-086000 A | 3/2003 |
| JP | 2003-086808 A | 3/2003 |

(56) References Cited

FOREIGN PATENT DOCUMENTS

| JP | 2004-103957 A | 4/2004 |
|---|---|---|
| JP | 2004-273614 A | 9/2004 |
| JP | 2004-273732 A | 9/2004 |
| JP | 2005-278135 | 10/2005 |
| JP | 2008-042826 A | 2/2008 |
| JP | 2008-042827 A | 2/2008 |
| JP | 2009-105381 A | 5/2009 |
| JP | 2011-229120 A | 11/2011 |
| JP | 2012-034354 A | 2/2012 |
| WO | WO-2004/114391 | 12/2004 |

OTHER PUBLICATIONS

Fortunato.E et al., "Wide-Bandgap High-Mobility ZnO Thin-Film Transistors Produced at Room Temperature,", Appl. Phys. Lett. (Applied Physics Letters), Sep. 27, 2004, vol. 85, No. 13, pp. 2541-2543.

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductor,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.

Hayashi.R et al., "42.1: Invited Paper: Improved Amorphous In—Ga—Zn—O TFTs,", SID Digest '08 : SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters), Jun. 17, 1996, vol. 68, No. 25, pp. 3650-3652.

Nakamura.M et al., "The phase relations in the In2O3—Ga2ZnO4—ZnO system at 1350° C.,", Journal of Solid State Chemistry, Aug. 1, 1991, vol. 93, No. 2, pp. 298-315.

Kimizuka.N. et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3—ZnGa2O4—ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics), Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Osada.T et al., "15.2: Development of Driver-Integrated Panel using Amorphous In—Ga—Zn—Oxide TFT,", SID Digest '09: SID International Symposium Digest of Technical Papers, May 31, 2009, pp. 184-187.

Nomura.K et al., "Carrier transport in transparent oxide semiconductor with intrinsic structural randomness probed using single-crystalline InGaO3(ZnO)5 films,", Appl. Phys. Lett. (Applied Physics Letters), Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO (Ga2O3—In2O3—ZnO) TFT,", SID Digest '08 : SID International Symposium Digest of Technical Papers, May 20, 2008, vol. 39, pp. 633-636.

Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDS,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing MOO3 as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium—Gallium—Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits , 2008, vol. 43, No. 1, pp. 292-299.

Ohara.H et al., "Amorphous In—Ga—Zn—Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back-Plane,", SID Digest '09 : SID International Symposium Digest of Technical Papers, May 31, 2009, pp. 280-283.

Lee.M et al., "15.4:Excellent Performance of Indium—Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.

Sakata.J et al., "Development of 4.0-In. AMOLED Display With Driver Circuit Using Amorphous In—Ga—Zn—Oxide TFTs,", IDW '09 : Proceedings of the 16th International Display Workshops, 2009, pp. 689-692.

Park.J et al., "Amorphous Indium—Gallium—Zinc Oxide TFTs and Their Application for Large Size AMOLED,", '08 Digest of Technical Papers, Jul. 2, 2008, pp. 275-278.

Park.S et al., "Challenge to Future Displays: Transparent AM-OLED Driven by Peald Grown ZnO TFT,", IMID '07 Digest, 2007, pp. 1249-1252.

Godo.H et al., "Temperature Dependence of Characteristics and Electronic Structure for Amorphous In—Ga—Zn—Oxide TFT,", AM-FPD '09 Digest of Technical Papers, Jul. 1, 2009, pp. 41-44.

(56) References Cited

OTHER PUBLICATIONS

Osada.T et al., "Development of Driver-Integrated Panel Using Amorphous In—Ga—Zn—Oxide TFT,", AM-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDS,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn—Oxide TFT,", SID Digest '09 : SID International Symposium Digest of Technical Papers, May 31, 2009, pp. 1110-1112.

Ohara.H et al., "21.3:4.0 In. QVGA AMOLED Display Using In—Ga—Zn—Oxide TFTs With a Novel Passivation Layer,", SID Digest '09 : SID International Symposium Digest of Technical Papers, May 31, 2009, pp. 284-287.

Miyasaka.M, "SUFTLA Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N. et al., "Spinel,YBFE2O4, and YB2FE3O7 Types of Structures for Compounds in the In2O3 and Sc2O3—A2O3—BO Systems [A; Fe, Ga, or, Al; B: Mg, Mn, Fe, Ni, Cu,or Zn] at Temperatures over 1000° C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B. (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium—Gallium—Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B (Physical Review B.), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters), Sep. 1, 2003, vol. 83, No. 9, pp. 1755-1757.

\* cited by examiner

FIG. 12A
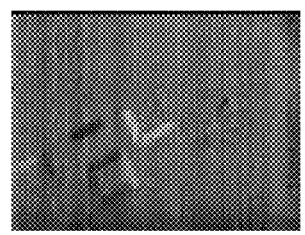
difference image
FIG. 12B
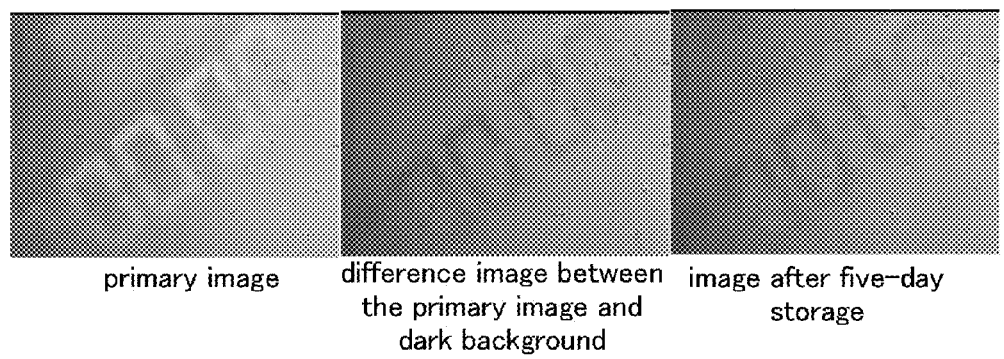
image stored in the pixel array    image being taken    difference image
FIG. 13A
FIG. 13B
FIG. 13C
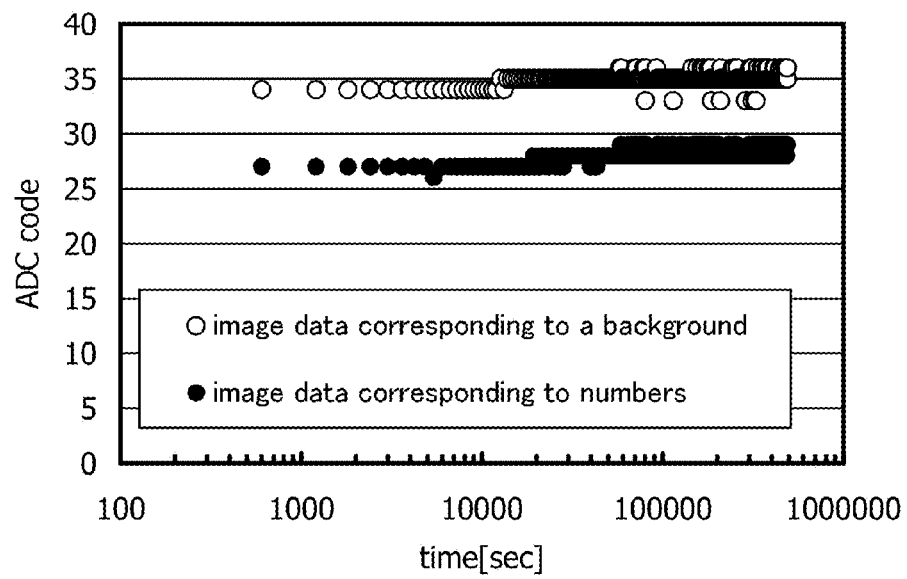
primary image    difference image between the primary image and dark background    image after five-day storage
FIG. 13D
○ image data corresponding to a background
● image data corresponding to numbers

IMAGE SENSOR, CAMERA, SURVEILLANCE SYSTEM, AND METHOD FOR DRIVING THE IMAGE SENSOR

BACKGROUND OF THE INVENTION

1. Field of the Invention

The present invention relates to a product (including a machine, a manufacture, and a composition of matter) and a process (including a simple process and a production process). For example, in this specification, a semiconductor device, a method for driving the semiconductor device, a method for manufacturing the semiconductor device, and the like are described. In this specification, in particular, an imaging device including a photoelectric conversion element (e.g. an image sensor), a method for driving the imaging device, a camera including the imaging device, a surveillance system including the imaging device, and the like are described.

A semiconductor device in this specification refers to any device that can function by utilizing semi conductor characteristics. A semi conductor circuit, an imaging device, an electro-optical device, a display device, a light-emitting device, an electronic device, and the like are all semiconductor devices.

2. Description of the Related Art

An imaging device including a pixel array in which a plurality of pixels are arranged two-dimensionally has been known. A typical imaging device having such a configuration is a CMOS image sensor (also referred to as a MOS image sensor). A CMOS image sensor can be manufactured using a standard CMOS LSI process; therefore, an image sensor in which a controller, a circuit for reading an analog signal from a pixel array, a signal processing circuit for the analog signal, and the like are integrated into one chip together with the pixel array (the main body of the sensor) has been developed. The signal processing circuit for the analog signal is arranged to be compatible with a method for reading a signal of the pixel array.

For example, there is a method in which one row of a pixel array is selected and analog signals are read at the same time from pixels at the selected row through vertical signal lines of the respective columns. As such a CMOS image sensor which performs column-parallel processing, an image sensor provided with a column-parallel (column type) analog-digital conversion device has been proposed (for example, see Patent Document 1). In the image sensor disclosed in Patent Document 1, an analog-digital conversion device (hereinafter also referred to as ADC) is connected to an output of each vertical signal line.

Further, an image sensor has higher performance by having an image processing function. For example, in Non-Patent Document 1, an image sensor having a motion detection function is described. In Non-patent Document 1, a photo signal obtained through a first light exposure is stored in a pixel memory and then a second light exposure is performed. After a period for the second light exposure, a photo signal obtained through the second light exposure and a photo signal obtained by combining the photo signal which was obtained through the first light exposure and stored in the pixel memory and the photo signal obtained through the second light exposure are read. By difference calculation of the photo signals in a correlated double sampling (CDS) circuit, motion is detected.

REFERENCE

Patent Document

[Patent Document 1] Japanese Published Patent Application No. 2005-278135

[Non-Patent Document 1] "A signal-processing CMOS image sensor using a simple analog operation", IEEE Journal of Solid-State Circuits, Vol. 38, No. 1, January 2003, pp. 101-106

SUMMARY OF THE INVENTION

In order to detect motion, it is necessary to obtain a difference in potential between optical signals (analog signals) which are detected in two frame periods by difference calculation of the optical signals. In Non-Patent Document 1, the difference is calculated in a CDS circuit which is provided outside a pixel array. On the other hand, the difference can also be calculated in a pixel, and for example, a method in which a current mirror circuit is provided in a pixel can be given. However, when each pixel is provided with a circuit for difference calculation, such as a current mirror circuit, the circuit size of the pixel becomes large, which hinders an increase in the resolution.

In view of the foregoing, an object in this specification is to provide an image sensor which can obtain a difference in potential in a pixel. Another object in this specification is to provide an image sensor including a pixel whose circuit size is not extremely large. Another object in this specification is to provide an image sensor including a pixel with a function of holding data.

Another object in this specification is to provide a semiconductor device having lower power consumption. Another object in this specification is to provide a semi conductor device including an oxide semi conductor. Another object in this specification is to provide a highly reliable semi conductor device including a semi conductor layer.

Note that the description of these objects does not impede the existence of other objects. Note that in one embodiment of the present invention, there is no need to achieve all the objects. Other objects will be apparent from and can be derived from the description of the specification, the drawings, the claims, and the like.

One embodiment of the invention disclosed in this specification is an image sensor including a pixel array which includes a plurality of pixels arranged two-dimensionally and a plurality of vertical signal lines each of which is provided per column. Each of the pixels includes a photoelectric conversion element; a node which stores a potential corresponding to the amount of electric charge generated in the photoelectric conversion element; a first capacitor which is connected in series between the photoelectric conversion element and the node; an amplifier circuit which outputs a signal corresponding to the potential of the node; a first switch which controls electrical conduction between the amplifier circuit and the corresponding vertical signal line; and a circuit which resets the potential of the node.

The pixel of the image sensor of the above embodiment can further include another capacitor one electrode of which is connected to the node and the other electrode of which is set to a constant potential. In addition, the pixel can further include another switch which controls electrical conduction between the photoelectric conversion element and the first capacitor.

The image sensor of the above embodiment can obtain a difference in potential between optical signals which are detected in different light-receiving periods in each pixel. The optical signal is detected by the photoelectric conversion element while the node is set to a constant potential. After that, when the node is brought into an electrically floating state, the electric charge of the node is stored, and thus the potential of the optical signal is stored in the node in a state of being inverted. When an optical signal is detected while the potential is stored in the node, the potential of the node increases in accordance with an output potential of the photoelectric conversion element, and thus the potential of the node corresponds to a difference in potential between the optical signals in different light-receiving periods.

Further, the image sensor of the above embodiment can include a signal processing circuit which converts an analog signal output from the pixel array through each of the plurality of vertical signal lines into an N-bit (N is an integer of 3 or more) or M-bit (M is an integer of 2 or more and less than N) digital signal.

Furthermore, in the image sensor of the above embodiment, an analog-digital conversion device (ADC) can be provided per vertical signal line. In this structural example, the ADC can include a comparator which compares an analog signal with a reference potential and a counter which measures a period dun ng which comparison operation is performed by the comparator and holds a measurement result of the period as a digital value. In this case, to the comparator, a first reference potential is input in order to obtain an N-bit digital value, and a second reference potential different from the first reference potential is input in order to obtain an M-bit digital value.

Another embodiment of the invention disclosed in this specification is a method for driving an image sensor including a pixel array which includes a plurality of pixels arranged two-dimensionally and a plurality of vertical signal lines each of which is provided per column; and a signal processing circuit which converts an analog signal output from the pixel array through each of the plurality of vertical signal lines into a digital signal. Each of the pixels includes a photoelectric conversion element; a node which stores a potential corresponding to the amount of electric charge generated in the photoelectric conversion element; a first capacitor which is connected in series between the photoelectric conversion element and the node; an amplifier circuit which outputs an analog signal corresponding to the potential of the node; a first switch which controls electrical conduction between the amplifier circuit and the vertical signal line; and a circuit which resets the potential of the node. The method for driving the image sensor includes a first step of bringing the node into an electrically floating state and accumulating electric charge in the photoelectric conversion element; a second step of accumulating electric charge in the photoelectric conversion element while the potential of the node is fixed, and bringing the node into an electrically floating state; a third step, after the second step, of accumulating electric charge in the photoelectric conversion element while the node is maintained in an electrically floating state; a fourth step of reading an analog signal corresponding to the potential of the node in the first step through the vertical signal line and converting the analog signal into an N-bit digital signal (N is an integer of 3 or more) in the signal processing circuit; and a fifth step of reading an analog signal corresponding to the potential of the node in the third step through the vertical signal line and converting the analog signal into an M-bit digital signal (M is an integer of 2 or more and less than N) in the signal processing circuit.

According to the invention disclosed in this specification, a difference in potential can be detected in a pixel without increase in the circuit size. In other words, an image sensor having a motion detection function can be provided without increase in the circuit size of a pixel.

BRIEF DESCRIPTION OF THE DRAWINGS

In the accompanying drawings:
FIG. 12A is a difference image (a display of a stopwatch),
and FIG. 12B is a diagram for describing a method for generating the difference image of FIG. 12A;
and
FIG. 13A is an image of a display of a stopwatch which is taken in a normal imaging mode;
FIG. 13B is a difference image;
FIG. 13C is a difference image which has been held for about five days;
and FIG. 13D is a graph showing change in the difference image data with respect to a holding period.

DETAILED DESCRIPTION OF THE INVENTION

Figure 1:
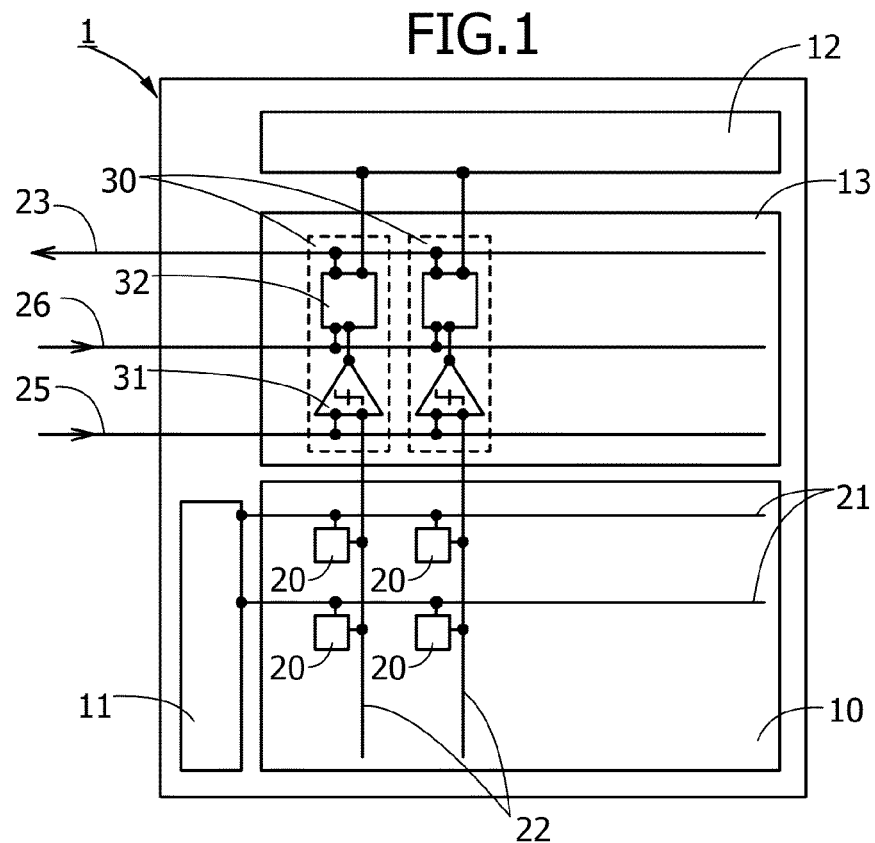
FIG. 1 is a block diagram illustrating an example of a configuration of an image sensor.

Hereinafter, embodiments and an example of the present invention will be described in detail with reference to the accompanying drawings. Note that the present invention is not limited to the description below, and it is easily understood by those skilled in the art that a variety of changes and modifications can be made without departing from the spirit and scope of the present invention. Therefore, the present invention is not construed as being limited to the description of the embodiments and example given below. Note that in the drawings used for the description of the embodiments and the example of the invention, the sane portions or portions having a similar function are denoted by the same reference numerals, and the repeated description thereof is omitted.

Embodiment 1

In this embodiment, an image sensor is described as an example of a semiconductor device with reference to FIG. 1, FIG. 2, FIG. 3, FIG. 4, FIG. 5, and FIG. 6.

FIG. 1 illustrates an example of a configuration of an image sensor 1 of this embodiment. The image sensor 1 includes a pixel array 10, a vertical shift register 11, a horizontal shift register 12, and a reading circuit 13.

<Pixel Array 10>

The pixel array 10 includes a plurality of pixels 20, selection signal lines 21 each of which is provided per row, and vertical signal lines 22 each of which is provided per column. The pixels 20 are arranged two-dimensionally in a matrix. The pixels 20 at one row are electrically connected to the vertical shift register 11 through one selection signal line 21, and the pixels at one column are connected to the reading circuit 13 through one vertical signal line 22. The vertical shift register 11 is a circuit which controls scanning of the columns of the pixel array 10, and the selection signal line 21 is a wiring through which a signal for controlling selection of the pixel 20 (pixel selection signal PSLCT) is input to the pixel 20. An optical signal detected by the pixel 20 in accordance with the pixel selection signal PSLCT (hereinafter referred to as signal PSLCT) is read out to the reading circuit 13 through the vertical signal line 22. The reading circuit 13 includes a signal processing circuit which converts an output signal of the pixel array 10 into a digital signal. The digital signal is output by a control signal from the horizontal shift register 12 from the reading circuit 13 to an external circuit of the image sensor 1 through a horizontal transfer line 23.

In the reading circuit 13, analog-digital conversion processing (hereinafter referred to as A-D conversion processing) is performed. The analog-digital conversion processing of the reading circuit 13 has a first conversion mode in which an analog signal input through the vertical signal line 22 is converted into an N-bit digital signal (N is an integer of 3 or more) and a second conversion mode in which the analog signal is converted into a 2-bit digital signal.

The reading circuit 13 includes the horizontal transfer line 23, an analog-digital conversion devices 30 (hereinafter referred to as an ADC 30) each of which is provided per column, a signal line 25, and a signal line 26. The ADC 30 includes a comparator 31 and a counter 32, and the vertical signal line 22 is connected to the comparator 31.

The comparator 31 is a circuit which compares a potential of a reference signal input from the signal line 25 with an input potential from the vertical signal line 22. The counter 32 is a counter which has a latching function and is a circuit which measures a comparison period during which the comparator 31 performs a comparison operation using a clock signal input from the signal line 26 and holds a result thereof as a digital value. An output of the counter 32 is output as a digital signal from the image sensor 1 through the horizontal transfer line 23. An output of the horizontal shift register 12 is connected to the counter 32. The horizontal shift register 12 performs scanning of the reading circuit 13 in the column direction and controls timing when each ADC 30 outputs a digital signal to the horizontal transfer line 23.

Note that in the image sensor 1, a circuit other than the circuits illustrated in FIG. 1 can be also integrated into the same chip. Examples of such a circuit are a controller, a clock generation circuit which generates a clock signal, and a digital-analog conversion circuit which generates a reference potential of the comparator 31.

Figure 2:
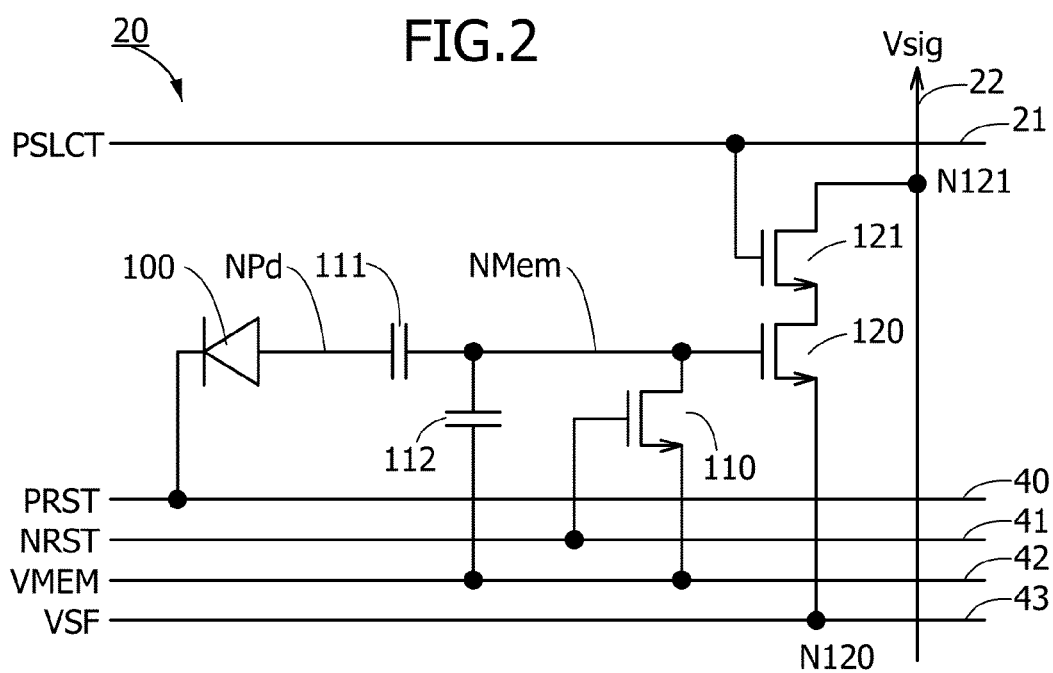
FIG. 2 is a circuit diagram illustrating an example of a configuration of a pixel.

The pixel 20 includes a photoelectric conversion element; a potential memory circuit which stores a potential corresponding to the amount of electric charge generated in the photoelectric conversion element; an amplifier circuit which amplifies an output potential of the potential memory circuit; a switch which controls electrical conduction between the amplifier circuit and the vertical signal line 22; and a circuit which resets the potential stored in the potential memory circuit. A specific configuration of a circuit of the pixel 20 is described below with reference to FIG. 2. FIG. 2 is a circuit diagram illustrating an example of a configuration of the pixel 20 of this embodiment.

<Configuration of Pixel 20>

The pixel 20 includes a photodiode 100, a transistor 110, a capacitor 111, a capacitor 112, a transistor 120, and a transistor 121. Further, the pixel 20 is electrically connected to a wiring 40, a wiring 41, a wiring 42, and a wiring 43 in addition to the selection signal line 21 and the vertical signal line 22.

Note that in the example of FIG. 2, the transistors 110, 120, and 121 are n-channel transistors.

In the pixel 20, the photodiode 100 is provided as a photoelectric conversion element. An input (cathode) of the photodiode 100 is connected to the wiring 40, and an output (anode) of the photodiode 100 is connected to an input of the potential memory circuit (one electrode of the capacitor 111). A reset signal PRST which resets a potential between the output of the photodiode 100 and the capacitor 111 (a potential of a node NPd) is input to the wiring 40. Therefore, the wiring 40 is also referred to as a reset signal line. The reset signal PRST (hereinafter referred to as the signal PRST) controls whether a forward bias potential or a reverse bias potential is applied to the photodiode 100.

The potential memory circuit includes a node NMem, the transistor 110, the capacitor 111, and the capacitor 112. The node NMem functions as a memory which stores a potential corresponding to the amount of electric charge generated in the photodiode 100.

The one electrode of the capacitor 111 is connected to the anode of the photodiode 100, and the other electrode of the capacitor 111 is connected to the node NMem. In other words, the capacitor 111 is connected in series between the photodiode 100 and the node NMem.

One electrode of the capacitor 112 is connected to the node NMem, and the other electrode of the capacitor 112 is connected to the wiring 42. The wiring 42 is a potential supply line which supplies a constant potential VMEM. Note that the capacitor 112 does not need to be provided as an element in the case where parasitic capacitance of the pixel 20 can be used. By provision of the capacitor 112 having a certain amount of capacitance, change in potential of the node NMem can be suppressed.

The transistor 110 serves as a reset circuit which resets a potential of the node NMem. A gate of the transistor 110 is connected to the wiring 41, a source of the transistor 110 is connected to the wiring 42, and a drain of transistor 110 is connected to the node NMem. The wiring 41 is a signal line which is supplied with a reset signal NRST (hereinafter referred to as a signal NRST) for controlling ON/OFF of the transistor 110, and referred to as a reset signal line.

The transistor 110 is a switch which controls electrical conduction between the node NMem and the wiring 42. With the switching operation of the transistor 110, whether the node NMem is brought into an electrically floating state or set to the constant potential is controlled. When the transistor 110 is turned on, the node NMem is connected to the wiring 42; therefore, the node NMem is reset to the constant potential regardless of the state of light received by the photodiode 100. When the transistor 110 is turned off, the node NMem is brought into an electrically floating state.

Although the capacitor 112 and the transistor 110 are connected to the wiring 42 in the example of FIG. 2, the capacitor 112 and the transistor 110 can be also connected to different potential supply lines.

The transistor 120 constitutes the amplifier circuit which outputs a signal corresponding to the output potential of the potential memory circuit (the potential of the node NMem), and the transistor 121 is a switch which controls electrical conduction between the amplifier circuit and the vertical signal line 22.

The amplifier circuit is a source follower composed of the transistor 120. A gate of the transistor 120 is connected to the node NMem, a source of the transistor 120 is connected to the wiring 43, and a drain of the transistor 120 is connected to a source of the transistor 121. The wiring 43 is a potential supply line for supplying a reference potential (potential VSF) to the source follower.

A gate of the transistor 121 is connected to the selection signal line 21, the source of the transistor 121 is connected to the drain of the transistor 120, and a drain of the transistor 121 is connected to the vertical signal line 22. The selection signal line 21 is a signal line for supplying a signal PSLCT for selecting the pixel 20 from which a signal Vsig is read from the pixels 20 connected to one selection signal line 21. The transistor 121 is turned on by the signal PSLCT, whereby the pixel 20 for reading the signal Vsig is selected.

Note that a node N121 can be alternatively connected to the wiring 43 for supplying the reference potential to the source follower, and a node N120 can be alternatively connected to the vertical signal line 22. Further, the anode of the photodiode 100 may be connected to the wiring 40, and the cathode of the photodiode 100 may be connected to the capacitor 111. Although all the three transistors 110, 120, and 121 are n-channel transistors in the example of FIG. 2, all or some of the transistors can be p-channel transistors. In the case where a circuit configuration is changed in this manner, a signal and a reference potential which are input to the pixel 20 needs to be adjusted.

<Operation of Pixel 20 and Imaging Modes 1 to 3>

Next, operation of the pixel 20 is described with reference to FIG. 3.

Since the node NMem which stores a potential is connected to the output of the photodiode 100 through the capacitor 111, there are two modes of accumulating electric charge in the photodiode 100. In one mode, electric charge is accumulated in the photodiode 100 while the node NMem is maintained in an electrically floating state. In the other mode, electric charge is accumulated in the photodiode 100 while the node NMem is set to the constant potential. By combining the two modes of accumulating electric charge, the pixel array 10 can operate with the following three imaging modes.

In a first imaging mode, an output potential of the photodiode 100 is detected and is read (Imaging Mode 1). In a second imaging mode, the output potential of the photodiode 100 is detected and stored in the potential memory circuit (Imaging Mode 2). In a third imaging mode, the output potential of the photodiode 100 is detected, and a difference in potential between the detected potential and the potential stored in the potential memory circuit is obtained and read (Imaging Mode 3).

The three imaging modes are described below with reference to FIG. 3. FIG. 3 shows an example of a timing chart of the pixel 20 and shows the signals PSLCT, PRST, and NRST; and change in the potential φPd of the node NPd and the potential φMem of the node NMem with respect to these signals. The potential φPd is an output potential of the photodiode 100, and the potential φMem is an output potential of the potential memory circuit.

Here, when the signal PRST is at low level (hereinafter referred to as L level), a forward bias potential is applied to the photodiode 100, and when the signal PRST is at high level (hereinafter referred to as H level), a reverse bias potential is applied to the photodiode 100. Further, when the signal NRST is at H level, the transistor 110 is turned on, and when the signal PSLCT is at H level, the transistor 121 is turned on.

[Imaging Mode 1]

First, Imaging Mode 1 is described. In Imaging Mode 1, operation of resetting potentials of the photodiode 100 and the potential memory circuit (a period T11) and operation of detecting and reading the output potential of the photodiode 100 (a period T12) are performed.

Since a forward bias potential is applied to the photodiode 100 in the period T11, the potential φPd becomes substantially equal to a potential of the wiring 40 (an L level potential V PD of the signal PRST) and is reset to the constant potential. Further, since the transistor 110 is turned on, the potential φMem becomes substantially equal to the potential VMEM of the wiring 42 and is reset to the constant potential.

Note that for easy understanding of the operation of the pixel 20, here, by reset operation, the potential φPd becomes equal to the L level potential VPD of the signal PRST, and the potential φMem becomes equal to the potential VMEM of the wiring 42.

In the period T12, a reverse bias potential is applied to the photodiode 100, and the transistor 110 is turned off. The potential φPd varies depending on the amount of electric charge generated in the photodiode 100 (the output potential of the photodiode 100), and the potential φMem varies depending on the change in the potential φPd.

Then, when the signal PSLCT is set to H level and the transistor 121 is turned on, current corresponding to the potential φMem flows between a source and a drain of the transistor 120 and is output to the vertical signal line 22 through the transistor 121. A period during which the signal PSLCT is at H level is a period during which the signal Vsig is read from the pixel 20. Since the potential φMem vales depending on the amount of electric charge detected by the photodiode 100, by detection of current between the source and the drain of the transistor 120, the output potential of the photodiode 100 can be detected.

Figure 3:
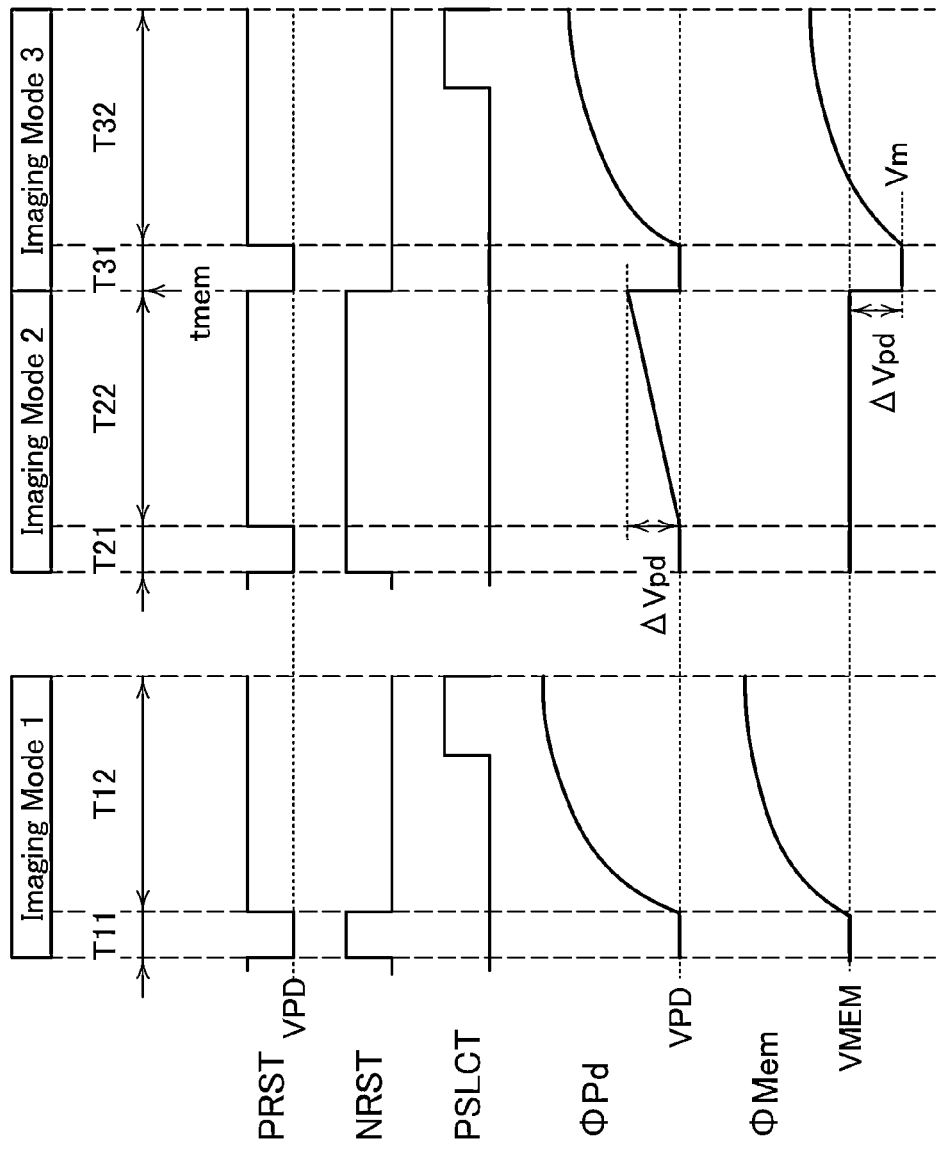
FIG. 3 is a timing chart showing an example of operation of a pixel.

Note that although an example in which the signal PSLCT is set to H level and reading is performed in part of the period T12 is shown in the timing chart of FIG. 3, the signal PSLCT may be continuously at H level in the period T12.

[Imaging Mode 2]

Next, Imaging Mode 2 is described. In Imaging Mode 2, operation of resetting the photodiode 100 and the potential memory circuit (a period T21) and storing of the output potential of the photodiode 100 (a period T22) are performed.

In the period T21, the potential φPd and the potential φMem are reset as in the period T11 of Imaging Model.

In the period T22, a reverse bias potential is applied to the photodiode 100. The potential φPd increases in accordance with the intensity of light received by the photodiode 100. On the other hand, the potential φMem does not change because the transistor 110 remains on. Since the potential φMem is fixed to the potential VMEM, the value of the potential φPd in the period T22 is smaller than that in the period T12 even when the intensity of light received by the photodiode 100 in the period T22 is substantially the same as that in the period T12.

The transistor 110 is turned off at the termination of the period T22 (time tmem). As a result, electric charge of the node NMem is held. The amount of electric charge of the node NMem at the time tmem depends on the potential φPd of the node N pd at the time tmem. In other words, a potential corresponding to the amount of electric charge accumulated in the photodiode 100 at the time tmem is stored in the node NMem.

[Imaging Mode 3]

Lastly, Imaging Mode 3 is described. In Imaging Mode 3, operation of resetting the output potential of the photodiode 100 (a period T31), and detection and reading of a difference between the output potential of the photodiode 100 and the potential stored in the node NMem (a period T32) are performed.

First, the potential φPd is reset to the constant potential in the period T31. Since the transistor 110 is off, the value of the potential φMem is Vm which is a value obtained by subtracting the amount of change in the potential φPd in the period T22 from the potential VMEM, i.e., VMEM−ΔVpd[C111/(C111+C112)] in accordance with principle of conservation of charge. C111 and C112 are a capacitance value of the capacitor 111 and a capacitance value of the capacitor 112, respectively. Here, the relation C111>>C112 is satisfied, and thus the relation Vm≈VMEM−ΔVpd is satisfied.

The potential Vm is a potential stored in the node NMem at the termination of the period T22. In other words, through Imaging Mode 2, the node NMem stores a potential obtained by inversion of the potential ΔVpd corresponding to the amount of electric charge accumulated in the photodiode 100.

In the period T32, a reverse bias potential is applied to the photodiode 100. Since electric charge corresponding to the intensity of light received by the photodiode 100 is accumulated in the photodiode 100, the potential φPd increases in accordance with the amount of accumulated electric charge, and the potential φMem increases in conjunction with change in the potential φPd. Since the relation Vm≈VMEM−ΔVpd is satisfied, the potential φMem in the period T32 is a difference between the output potential of the photodiode 100 in the period T32 and the potential of the node NMem which is stored at the termination of the period T22 (the time tmem). In other words, the potential φMem in the period T32 corresponds to a difference between the output potential of the photodiode 100 in Imaging Mode 3 and the output potential of the photodiode 100 in Imaging Mode 2.

Accordingly, the presence or absence of motion can be judged from the potential φMem in Imaging Mode 3. When there is no motion in a region where an image is taken by the pixel 20, the potential φMem can become equal to the potential VMEM by adjustment of the length of the periods (T22 and T32) for accumulating electric charge in the photodiode 100. On the other hand, when there is motion, the potential φMem becomes different from the potential VMEM. In the case where the amount of light received by the photodiode 100 in the period T32 is larger than that in the period T22, the potential φMem becomes higher than the potential VMEM. In the case where the amount of light received by the photodiode 100 in the period T32 is smaller than that in the period T22, the potential φMem becomes lower than the potential VMEM.

When the signal PSLCT is set to H level in the period T32, the transistor 120 outputs the signal Vsig corresponding to the potential φMem to the vertical signal line 22.

Note that although an example in which the signal PSLCT is set to H level and reading operation is performed in part of the period T32 is shown in the chart of FIG. 3, the signal PSLCT may be continuously at H level in the period T32.

Note that for easy understanding of the operation of the pixel 20, an example in which Imaging Mode 2 and Imaging Mode 3 are successively performed is shown in FIG. 3; however, Imaging Mode 2 does not need to be carried out just before Imaging Mode 3, and Imaging Mode 3 can be repeated after Imaging Mode 2 is carried out one time. This is because the node NMem is in an electrically floating state as long as the transistor 110 is off, and thus electric charge is stored in the node NMem.

<Operation of the ADC 30 and A-D Conversion Processing>

Figure 4:
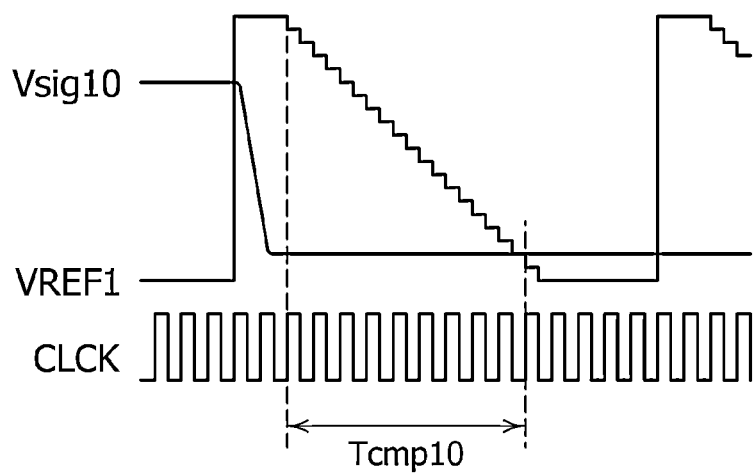
FIG. 4 is a timing chart showing an example of operation of an analog-digital conversion device.
Figure 5:
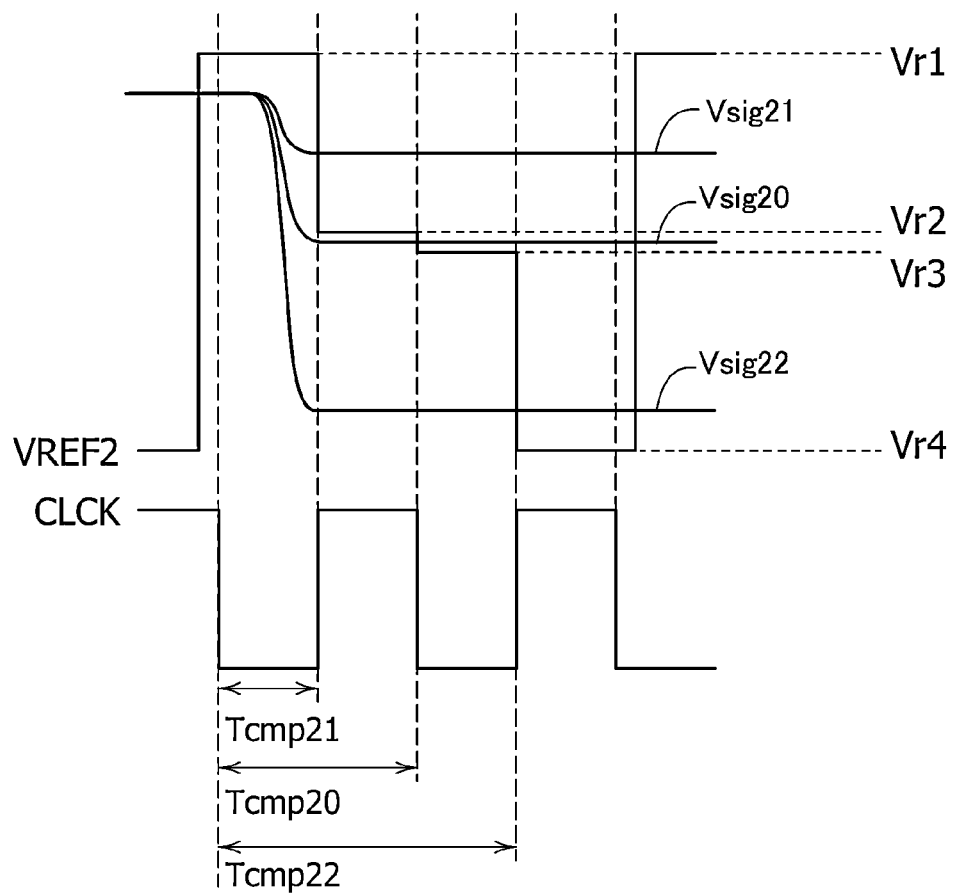
FIG. 5 is a timing chart showing an example of operation of an analog-digital conversion device.

Next, A-D conversion processing in the reading circuit 13 is described with reference to FIG. 4 and FIG. 5. FIG. 4 and FIG. 5 are timing charts each showing an example of operation of the ADC 30 in the reading circuit 13.

A-D conversion processing of the ADC 30 has two conversion modes. A first conversion mode is a mode in which an analog signal input from the vertical signal line 22 is converted into an N-bit digital signal (N is an integer of 3 or more) (ADC Mode 1). A second conversion mode is a mode in which the analog signal is converted into a digital signal with two bits (ADC Mode 2).

[ADC Mode 1]

ADC Mode 1 is described with reference to FIG. 4. ADC Mode 1 is a normal A-D conversion mode in which analog data obtained in the pixel array 10 is converted into N-bit grayscale data. ADC Mode 1 is a mode in which the signal Vsig of the pixel 20 in Imaging Mode 1 or Imaging Mode 3 is converted into an N-bit digital signal.

A reference signal VREF1 is input from the signal line 25 to the comparator 31 of the ADC 30. The reference signal VREF1 includes a ramp wave which changes in a stepwise manner. In the comparator 31, a signal Vsig10 which is read from the pixel 20 and is input through the vertical signal line 22 (hereinafter referred to as a signal Vsig10) is compared with the reference signal VREF1. When the potential of the signal Vsig10 becomes equal to the potential of the reference signal VREF1, the polarity of an output potential from the comparator 31 to the counter 32 is inverted. The counter 32 performs counting based on a reference clock signal CLCK (hereinafter referred to as a signal CLCK), stops counting when the output of the comparator 31 is inverted, and holds a count value. A comparison period Tcmp10 is a period from the start of the comparison operation to the inversion of the output of the comparator 31. In the counter 32, measurement is performed by replacing the potential of the output signal Vsig10 with the comparison period Tcmp10. The count value obtained in the counter 32 corresponds to a digital value which represents a potential of the signal Vsig10.

[ADC Mode 2]

Next, ADC Mode 2 is described with reference to FIG. 5. ADC Mode 2 is a mode in which a motion detection result is converted into a digital value and an output signal of the pixel 20 is converted into a digital signal with the low-order 2 bits of N bits. ADC Mode 2 is a mode in which the signal Vsig of the pixel 20 of Imaging Mode 3 is converted into a digital value. Here, although ADC Mode 2 is described as a mode in which an analog signal is converted into a 2-bit digital signal, the number of bits of the digital signal is not particularly limited to two. ADC Mode 2 is a mode in which an output signal of the pixel 20 is converted into a digital signal with the number of bits which is smaller than N.

A signal Vsig20, a signal Vsig21, and a signal Vsig22 are each a signal Vsig which is real from the pixel 20 in Imaging Mode 3 and corresponds to a difference in potential. The signal Vsig20 is a signal which is obtained in the case where an object has no motion and in the case where the amount of received light in Imaging Mode 3 is substantially equal to that in Imaging Mode 2 (the case where difference data is 0). The signals Vsig21 and Vsig22 are each an output signal of the pixel 20 which is obtained in the case where an object has motion. The signal Vsig21 is a signal which is obtained in the case where the amount of received light in Imaging Mode 3 is decreased (the case where difference data is negative), and the signal Vsig22 is a signal which is obtained in the case where the amount of received light in Imaging Mode 3 is increased (the case where difference data is positive).

A reference signal VREF2 of ADC Mode 2 is different from the reference signal VREF1 of ADC Mode 1. The potential of the reference signal VREF2 is changed in three levels in conjunction with the signal CLCK during two cycles of the signal CLCK so that the following three states can be distinguished: a state where motion is not detected, a state where motion is detected (the amount of received light is decreased), and a state where motion is detected (the amount of received light is increased). The reference signal VREF2 is not changed uniformly like a ramp wave. The potential of the reference signal VREF2 sequentially changes to potentials Vr1, Vr2, Vr3, and Vr4 by half the cycle of the signal CLCK from the start of counting. The range of the potential of the signal Vsig in which difference data is determined to be 0 is determined by the potentials Vr2 and Vr3. The potentials Vr2 and Vr3 may be determined in consideration of change in potential of the node NMem during the operation of the pixel 20, the detection accuracy of a difference in potential, or the like.

A comparison period Tcmp20, a comparison period Tcmp21, and a comparison period Tcmp22 corresponds to a comparison period of the signal Vsig20, a comparison period of the signal Vsig21, and a comparison period of the signal Vsig22, respectively. Operation of the ADC 30 in ADC Mode 2 is similar to that in ADC Mode 1, and the signal Vsig20, the signal Vsig21, and the signal Vsig22 are converted into 2-bit digital values 00, 01, and 10. The digital signal obtained in ADC Mode 2 is read from the image sensor 1 through the horizontal transfer line 23. The 2-bit digital signal which is read (difference data) is processed, whereby the presence or absence of motion, a region where motion is detected, or the like can be determined.

Further, in the case where the presence or absence of motion is determined based on the 2-bit digital signal (difference data), a determination result can determine which of Imaging Mode 1, Imaging Mode 2, and Imaging Mode 3 is performed and which of ADC Mode 1 and ADC Mode 2 is performed by the image sensor 1. In the case where there is no motion, imaging data is not changed; therefore, Imaging Mode 3 and ADC Mode 2 are performed. In the case where there is motion, in order to rewrite the imaging data, the image sensor 1 may be controlled in such a manner that Imaging Mode 1 and ADC mode 1 are performed or in such a manner that Imaging Mode 2 and Imaging Mode 3 are successively performed, and then ADC Mode 1 is performed.

As described above, according to this embodiment, a difference in potential which is needed for detection of motion can be obtained by each pixel. Further, as illustrated in FIG. 2, the circuit size of the pixel is not so large as to drastically reduce a light-receiving area of the photoelectric conversion element. In other words, according to this embodiment, high resolution and miniaturization of the image sensor with a function of detecting motion can be realized.

<Surveillance System>

Further, the image sensor of this embodiment is very suitable for a surveillance camera. A surveillance camera takes the same image as long as an object does not have motion in the same imaging region. On the other hand, in order to obtain image data for recording and display, the analog signal detected in the pixel array needs to be converted into an N-bit digital signal. In a conventional image sensor, A-D conversion of N bits is performed in each frame even when the same image is taken, and thus unnecessary power is consumed, which leads to acceleration of deterioration of the image sensor.

By using the image sensor of this embodiment, such a problem can be resolved. An example of a surveillance system is described with reference to FIG. 6 and FIG. 7.

Figure 6:
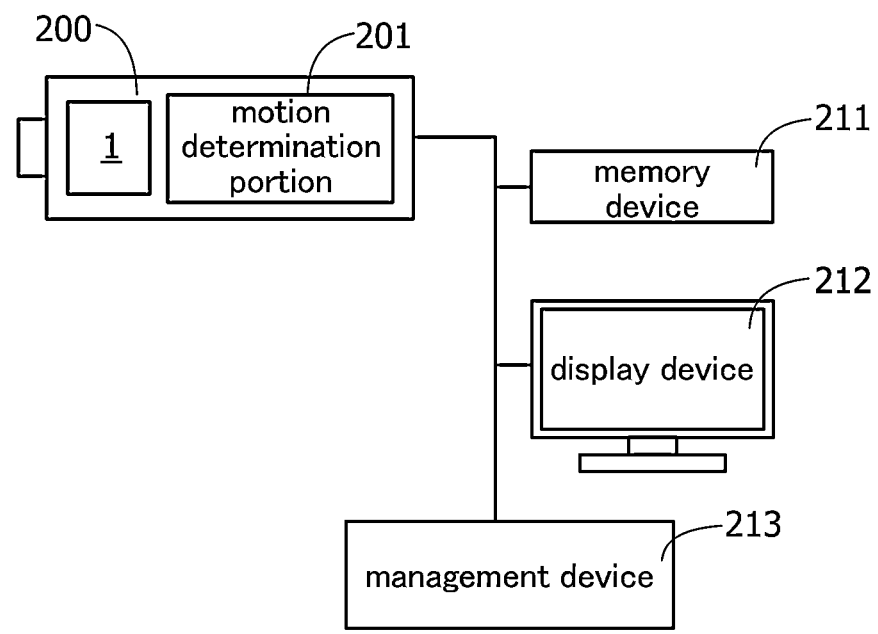
FIG. 6 is a block diagram illustrating an example of a configuration of a surveillance system.

FIG. 6 is a block diagram illustrating the structural example of the surveillance system of this embodiment. The surveillance system includes a camera 200, a memory device 211, a display device 212, and a management device 213. The camera 200 includes the image sensor 1 as an imaging unit and also includes a motion determination portion 201 which processes a digital signal output from the image sensor 1 and determines whether a taken image has motion or not. The image taken by the camera 200 is stored in the memory device 211 and displayed in the display device 212. Further, the management device 213 collectively manages and controls the devices in the surveillance system. The management device 213 includes a surveillance server, a computer on which software for management is installed, and the like.

Figure 7:
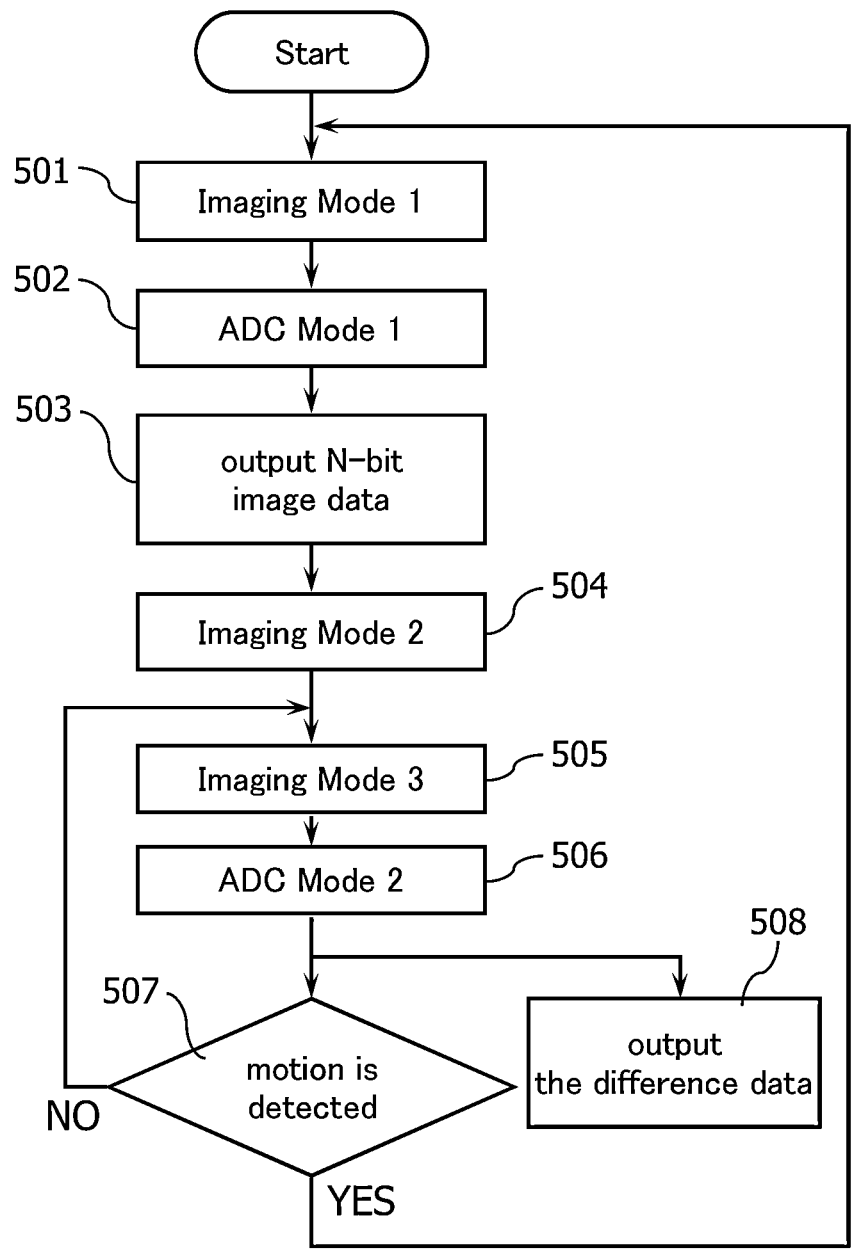
FIG. 7 is a flow chart showing an example of operation of a camera in a surveillance system.

Operation of the camera 200 of the surveillance system is described with reference to FIG. 7. FIG. 7 is a flow chart showing operation of the camera 200.

First, at the time of operation start, the camera 200 obtains an image serving as a reference. First, the pixel array 10 is operated in Imaging Mode 1, and an analog signal serving as a reference for motion determination is obtained (Step 501). Next, the reading circuit 13 converts the analog signal into an N-bit digital signal in ADC Mode 1 (Step 502). Then, N-bit image data which is obtained from the image sensor 1 in Step 502 is output from the camera 200 (Step 503). By control of the management device 213, the N-bit output image data is stored in the memory device 211 and displayed in the display device 212.

Next, motion detection and motion determination are performed (Step 504, Step 505, Step 506, and Step 507). In order to obtain imaging data serving as a reference, first, the pixel array 10 is operated in Imaging Mode 2 (Step 504), and then is operated in Imaging Mode 3 to obtain an analog signal corresponding to a difference in potential (Step 505). After that, the reading circuit 13 converts the analog signal into a 2-bit digital signal in ADC Mode 2 to obtain 2-bit difference data (Step 506). The difference data is input to the motion determination portion 201 and whether the image data taken in Step 505 has motion or not is determined (Step 507). In the case where there is no motion, Steps 505 to 507 are performed again. In the case where there is motion, Steps 501 to 503 are performed in order to obtain the N-bit image data again. In other words, Steps 505 to 507 are repeated until motion is detected in Step 507.

Further, the difference data obtained in Step 507 is output from the camera 200 as necessary (Step 508). For example, Step 508 is performed in order to store the difference data in the memory device 211.

Accordingly, in a period during which motion is not detected in an image, the imager sensor 1 performs A-D conversion processing of the low-order 2 bits and not A-D conversion processing of N bits. As a result, power consumption of the image sensor 1 can be reduced and deterioration of the image sensor 1 can be suppressed. Further, N-bit image data can be stored in the memory device 211 when motion is detected, and thus the storage capacity of the memory device 211 can be saved, so that long-time recording becomes possible.

Note that motion determination of Step 507 may be performed by a device external to the camera 200. For example, the difference data obtained in Step 506 is subjected to signal processing in the management device 213, whereby motion determination can be performed. In this case, motion determination processing in the management device 213 may be performed using hardware with a circuit for image processing incorporated in the management device 213 or using software.

Embodiment 2

In this embodiment, another configuration example of the pixel 20 is described. In this embodiment, a pixel for realizing an image sensor using a global shutter method is described with reference to FIG. 8 and FIG. 9.

<Configuration of Pixel 50>

Figure 8:
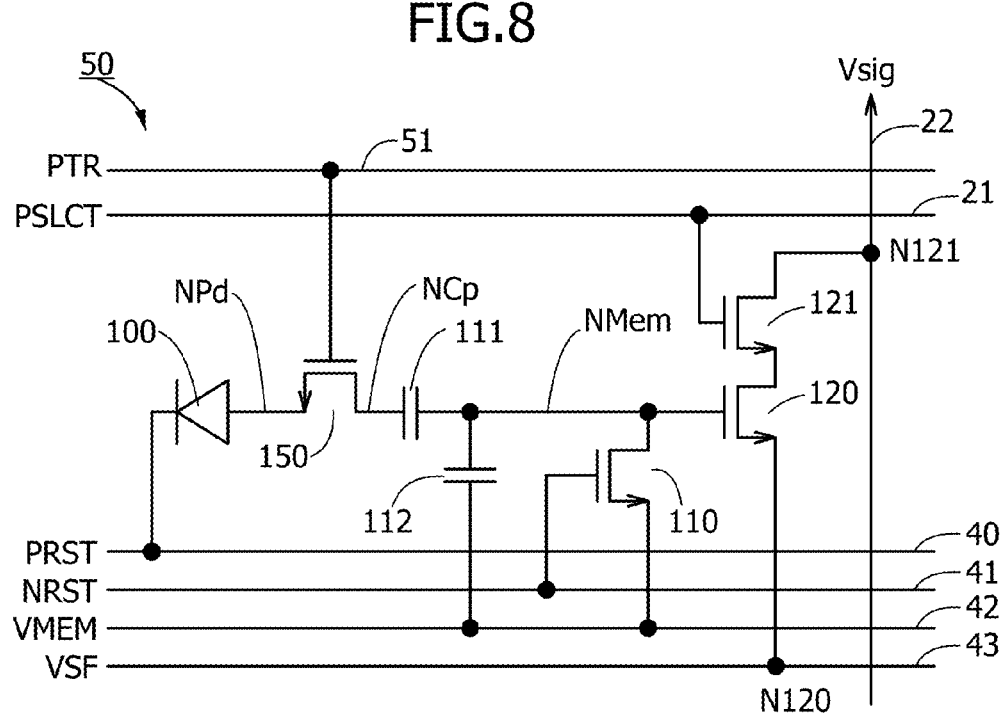
FIG. 8 is a circuit diagram illustrating an example of a configuration of a pixel.

FIG. 8 is a circuit diagram illustrating an example of a configuration of a pixel 50 of this embodiment. The pixel 50 is different from the pixel 20 in that a switch for controlling electrical conduction between the photodiode 100 and the capacitor 111 is provided. In the pixel 50, a transistor 150 is provided as the switch. A gate of the transistor 150 is connected to a wiring 51, a source of the transistor 150 is connected to an output (an anode) of the photodiode 100, and a drain of the transistor 150 is connected to one electrode of the capacitor 111. The wiring 51 is a signal line to which a charge transmission control signal PTR (hereinafter referred to as a signal PTR) for controlling ON/OFF of the transistor 150 is input.

Note that although the transistor 150 is an n-channel transistor in the example of FIG. 8, it is needless to say that a p-channel transistor can be employed.

<Operation of Pixel 50 and Imaging Mode 1 to 3>

Figure 9:
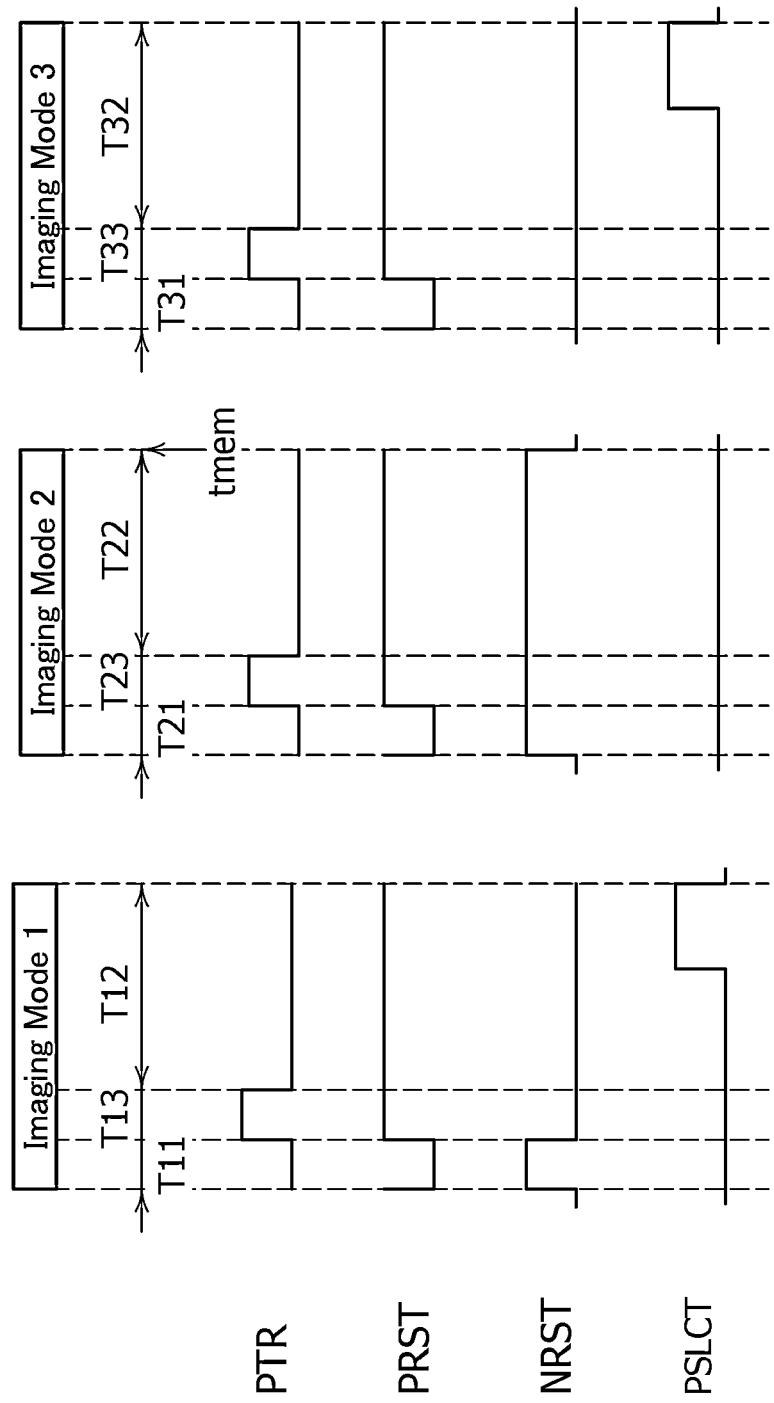
FIG. 9 is a timing chart showing an example of operation of a pixel.

Next, operation of the pixel 50 is described with reference to FIG. 9. The pixel 50 can be operated in Imaging Modes 1 to 3 in a manner similar to that of the pixel 20. The operation of the pixel 50 is different from that of the pixel 20 in that in Imaging Modes 1 to 3, periods (T13, T23, and T33) during which the transistor 150 is in an on state by setting the signal PTR of the wiring 51 to H level are provided right after reset periods (T11, T21, and T31) of the photodiode 100.

In the periods (T13, T23, and T33), the signal FIR is set to H level, whereby the transistor 150 is turned on. Potentials of the node NPd and a node NCp (a node between the drain of the transistor 150 and the one electrode of the capacitor 111) are increased in accordance with the amount of electric charge accumulated in the photodiode 100. In other words, the potentials of the node NPd and the node NCp change in a manner similar to that of the potential φPd in FIG. 3.

In periods (T12, T22, and T32), the signal PTR is set to L level, whereby the transistor 150 is turned off. In the period during which the transistor 150 is off, the potential of the node NCp does not change, and the node NMem does not change either.

The periods (T13, T23, and T33) are light exposure periods, and the switching operation of the transistor 150 serves as an electric shutter. The node NCp in the light exposure periods (T13, T23, and T33) has the same function as the node NPd of the pixel 20; therefore, Imaging Modes 1 to 3 can also be performed in the pixel 50 as in the pixel 20. Accordingly, by applying the pixel 50 to the image sensor 1, an image sensor with a global shutter function and a motion detection function can be achieved.

This embodiment can be implemented in appropriate combination with the other embodiments.

Embodiment 3

As described above, in the image sensor disclosed in this specification, each pixel can detect a difference in potential between optical signals in two different frames, and can detect a difference in potential between optical signals of not only successive two frames but two frames one of which is two or more frames before the other. Further, the detection accuracy of the difference in potential depends on the charge holding capability of the node (NMem) which functions as a memory of the potential memory circuit.

For example, in the pixel 20 where the leakage current of the transistor 110 at room temperature is approximately $1 \times 10^{-14}$ A and the capacitance of the capacitor 112 is approximately 100 f F, when the frame rate is 60 fps, on the assumption that the potentials of the wirings other than the node NMem do not change, a period during which electric charge (potential) can be held at the node NMem is approximately one frame period (1/60 second).

Now, in this embodiment, means to improve the charge holding capability of the potential memory circuit is described. This embodiment is described using the pixel 20 of FIG. 2 as an example below; however, the same applies also to the pixel 50 of FIG. 8.

One of the means to improve the charge holding capability of the node NMem is to increase the capacitance value of the capacitor 112. Note that in order to increase the capacitance value of the capacitor 112, the size of the capacitor 112 sometimes needs to be increased. When the size of the capacitor 112 is increased, the aperture ratio of the pixel 20 is decreased, which hinders an increase in the resolution of the image sensor.

Another means to improve the charge holding capability of the node NMem is to reduce the leakage current of the transistor 110. In this case, the problem of a reduction in the aperture ratio of the pixel 20 becomes small. When the leakage current of the transistor 110 is set to be lower than $1 \times 10^{-14}$ A, the node NMem can hold a potential for greater than or equal to 1/60 seconds (greater than or equal to one frame period in the case where the frame rate is 60 fps).

Leakage current refers to a current which flows between a source and a drain in a transistor which is in an off state. In this specification, "leakage current is reduced" means that an off-state current value per micrometer of a channel width at room temperature is less than or equal to 10 aA/μm ($1 \times 10^{-17}$ A/μm).

Figure 10:
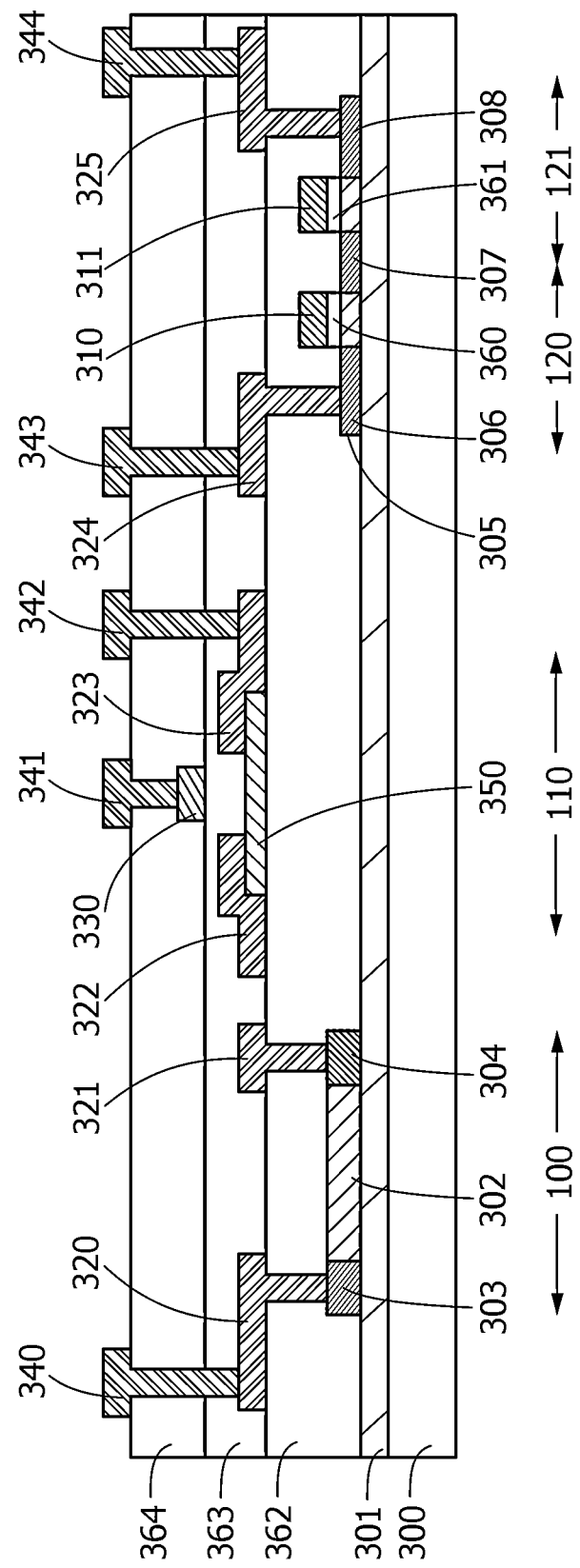
FIG. 10 is a cross-sectional view illustrating an example of a configuration of a pixel.

One of means to reduce the leakage current of the transistor 110 is to form a semiconductor layer of the transistor 110 using an oxide semiconductor. A configuration of the pixel 20 including the transistor 110 to which an oxide semiconductor layer is applied is described below with reference to FIG. 10. FIG. 10 is a schematic cross-sectional view of the pixel 20. Note that FIG. 10 is not a cross-sectional view taken along a particular section line of the pixel 20 but a cross-sectional view for illustrating the configuration and a manufacturing method of the pixel 20.

FIG. 10 illustrates a configuration example of the pixel 20 which is manufactured using an 301 semiconductor substrate. A substrate 300 is a supporting substrate of the 301 substrate, and an insulating layer 301 is an insulating layer of the 301 substrate. As the substrate 300, a semiconductor substrate, a quartz substrate, a glass substrate, or the like is used. A semiconductor layer 302 of the photodiode 100 and a semiconductor layer 305 of the transistor 120 and the transistor 121 are formed using a single crystal semiconductor layer of the 301 substrate. The semiconductor layer 305 is formed thinner than the semiconductor layer 302. An n-type impurity region 303 and a p-type impurity region 304 are formed in the semiconductor layer 302, and an n-type impurity region 306, an n-type impurity region 307, and an n-type impurity region 308 are formed in the semi conductor layer 305.

Further, an insulating layer 360 and an insulating layer 361 are each a first insulating layer, and are formed using the same insulating layer. The insulating layer 360 serves as a gate insulating layer of the transistor 120, and the insulating layer 361 serves as a gate insulating layer of the transistor 121. Further, an insulating layer 362 is a second insulating layer, an insulating layer 363 is a third insulating layer, and an insulating layer 364 is a fourth insulating layer.

The first to fourth insulating layers 360 to 364 are each formed using an insulating layer having a single-layer structure or a stacked-layer structure. The insulating layer can be a layer containing an insulator such as silicon oxide, silicon nitride, silicon oxynitride, silicon nitride oxide, aluminum oxide, aluminum nitride, aluminum oxynitride, aluminum nitride oxide, or hafnium oxide, for example.

A conductive layer 310 and a conductive layer 311 are each a first wiring layer and are formed using the same conductive layer. The conductive layer 310 forms a gate electrode of the transistor 120, and the conductive layer 311 forms a gate electrode of the transistor 121 and the selection signal line 21.

A conductive layer 320, a conductive layer 321, a conductive layer 322, a conductive layer 323, a conductive layer 324, and a conductive layer 325 are each a second wiring layer, and formed using the sane conductive layer. The conductive layer 320 forms an electrode for connecting the cathode of the photodiode 100 to the wiring 40. The conductive layer 321 forms an electrode for connecting the anode of the photodiode 100 to the capacitor 111. The conductive layer 322 forms a drain electrode of the transistor 110, and the conductive layer 323 forms a source electrode of the transistor 110. The conductive layer 324 forms a source electrode of the transistor 120, and the conductive layer 325 forms a drain electrode of the transistor 121. Further, the conductive layer 322 forms the one electrode of the capacitor 111 and the node NMem and is connected to the conductive layer 310.

A conductive layer 330 is a third wiring layer and forms a gate electrode of the transistor 110.

A conductive layer 340, a conductive layer 341, a conductive layer 342, a conductive layer 343, and a conductive layer 344 are each a fourth wiring layer and formed using the same conductive layer. The conductive layer 340 forms the wiring 40 and is connected to the conductive layer 320. The conductive layer 341 forms the wiring 41 and is connected to the conductive layer 330. The conductive layer 343 forms the wiring 43 and is connected to the conductive layer 324. The conductive layer 344 forms the vertical signal line 22 and is connected to the conductive layer 325.

The first wiring layer (310 and 311), the second wiring layer (320 to 325), the third wiring layer (330), and the fourth wiring layer (340 to 344) are each formed using a conductive layer having a single-layer structure or a stacked-layer structure. A conductive layer used for the first to fourth wiring layers can be, for example, a conductive layer containing a metal material such as molybdenum, titanium, chromium, tantalum, magnesium, silver, tungsten, aluminum, copper, neodymium, or scandium.

A semiconductor layer 350 of the transistor 110 is formed over the insulating layer 362. Here, in order to manufacture the transistor 110 with small leakage current, the semiconductor layer 350 is an oxide semi conductor layer.

As a typical oxide semi conductor, a metal oxide containing zinc and one of indium and gallium; a metal oxide containing indium, gallium, and zinc; a metal oxide in which gallium contained in the above metal oxide is partly or entirely replaced with another metal element; and the like can be given.

The oxide semiconductor preferably contains at least one of indium (In) and zinc (Zn). Both In and Zn are more preferably contained. As the oxide semiconductor, an In oxide, a Zn oxide, an In—Zn oxide, and an In—Ga—Zn oxide can be given, for example.

The semiconductor layer 350 is preferably formed using a metal oxide containing gallium (Ga). When the semiconductor layer 350 is formed using a metal oxide containing gallium (Ga), variation in the transistor characteristics can be reduced. An element having an effect of reducing variation in the transistor characteristics is referred to as a stabilizer. As a stabilizer, tin (Sn), hafnium (Hf), and aluminum (Al), can be given.

As a stabilizer other than the above, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be given.

One or plural kinds of elements may be contained in the oxide semiconductor as a stabilizer. A stabilizer is contained at an amount in which a metal oxide can serve as a semiconductor.

For example, when tin is used instead of all of Ga (gallium) contained in the In—Ga—Zn oxide, an In—Sn—Zn oxide is obtained. When titanium is replaced with part of Ga (gallium) contained in the In—Ga—Zn oxide, an In—Ti—Ga—Zn oxide is obtained.

The oxide semiconductor layer included in the semiconductor layer 350 is in a single crystal state, a polycrystalline (also referred to as polycrystal) state, an amorphous state, or the like. Alternatively, the oxide semiconductor layer can have a stacked-layer structure of an amorphous layer and a layer including a crystal. The semiconductor layer 350 may be an oxide semiconductor layer including a c-axis aligned crystal line oxide semi conductor (CAAC-OS).

An oxide semiconductor layer may be in a non-single-crystal state, for example. The non-single-crystal state is, for example, structured by at least one of c-axis aligned crystal (CAAC), polycrystal, microcrystal, and an amorphous part. The density of defect states of an amorphous part is higher than those of microcrystal and CAAC. The density of defect states of microcrystal is higher than that of CAAC. Note that an oxide semiconductor including CAAC is referred to as a CAAC-OS (c-axis aligned crystal line oxide semi conductor).

For example, an oxide semiconductor layer may include a CAAC-OS. In the CAAC-OS, for example, c-axes are aligned, and a-axes and/or b-axes are not macroscopically aligned.

For example, an oxide semiconductor layer may include microcrystal. Note that an oxide semiconductor including microcrystal is referred to as a microcrystalline oxide semiconductor. A microcrystalline oxide semiconductor film includes microcrystal (also referred to as nanocrystal) with a size greater than or equal to 1 nm and less than 10 nm, for example. Alternatively, a microcrystalline oxide semiconductor film, for example, includes a crystal-amorphous mixed phase structure where crystal parts (each of which is greater than or equal to 1 nm and less than 10 nm) are distributed.

For example, an oxide semiconductor layer may include an amorphous part. Note that an oxide semiconductor including an amorphous part is referred to as an amorphous oxide semiconductor. An amorphous oxide semiconductor film, for example, has disordered atomic arrangement and no crystalline component. Alternatively, an amorphous oxide semiconductor film is, for example, absolutely amorphous and has no crystal part.

Note that an oxide semiconductor layer may be a mixed film including any of a CAAC-OS, a microcrystalline oxide semiconductor, and an amorphous oxide semi conductor. The mixed film, for example, includes a region of an amorphous oxide semi conductor, a region of a microcrystalline oxide semi conductor, and a region of a CAAC-OS. Further, the mixed film may have a stacked structure including a region of an amorphous oxide semi conductor, a region of a microcrystalline oxide semi conductor, and a region of a CAAC-OS, for example.

Note that an oxide semiconductor layer may be in a single-crystal state, for example.

An oxide semiconductor layer preferably includes a plurality of crystal parts. In each of the crystal parts, a c-axis is preferably aligned in a direction parallel to a normal vector of a surface where the oxide semiconductor layer is formed or a normal vector of a surface of the oxide semiconductor layer. Note that, among crystal parts, the directions of the a-axis and the b-axis of one crystal part may be different from those of another crystal part. An example of such an oxide semiconductor layer is a CAAC-OS film.

The CAAC-OS film is not absolutely amorphous. The CAAC-OS film, for example, includes an oxide semiconductor with a crystal-amorphous mixed phase structure where crystal parts and amorphous parts are intermingled. Note that in most cases, the crystal part fits inside a cube whose one side is less than 100 nm. In an image obtained with a transmission electron microscope (TEM), a boundary between an amorphous part and a crystal part and a boundary between crystal parts in the CAAC-OS film are not clearly detected. Further, with the TEM, a grain boundary in the CAAC-OS film is not clearly found. Thus, in the CAAC-OS film, a reduction in electron mobility due to the grain boundary is suppressed.

In each of the crystal parts included in the CAAC-OS film, for example, a c-axis is aligned in a direction parallel to a normal vector of a surface where the CAAC-OS film is formed or a normal vector of a surface of the CAAC-OS film. Further, in each of the crystal parts, metal atoms are arranged in a triangular or hexagonal configuration when seen from the direction perpendicular to the a-b plane, and metal atoms are arranged in a layered manner or metal atoms and oxygen atoms are arranged in a layered manner when seen from the direction perpendicular to the c-axis. Note that, among crystal pats, the directions of the a-axis and the b-axis of one crystal part may be different from those of another crystal part. In this specification, a term "perpendicular" includes a range from 80° to 100°, preferably from 85° to 95°. In addition, a term "parallel" includes a range from −10° to 10°, preferably from −5° to 5°.

In the CAAC-OS film, distribution of crystal pats is not necessarily uniform. For example, in the formation process of the CAAC-OS film, in the case where crystal growth occurs from a surface side of the oxide semiconductor layer, the proportion of crystal pats in the vicinity of the surface of the oxide semiconductor layer is higher than that in the vicinity of the surface where the oxide semiconductor layer is formed in some cases. Further, when an impurity is added to the CAAC-OS film, the crystal part in a region to which the impurity is added becomes amorphous in some cases.

Since the c-axes of the crystal pats included in the CAAC-OS film are aligned in the direction parallel to a normal vector of a surface where the CAAC-OS film is formed or a normal vector of a surface of the CAAC-OS film, the directions of the c-axes may be different from each other depending on the shape of the CAAC-OS film (the cross-sectional shape of the surface where the CAAC-OS film is formed or the cross-sectional shape of the surface of the CAAC-OS film). Note that the film deposition is accompanied with the formation of the crystal pats or followed by the formation of the crystal pats through crystallization treatment such as heat treatment. Hence, the waxes of the crystal pats are aligned in the direction parallel to a normal vector of the surface where the CAAC-OS film is formed or a normal vector of the surface of the CAAC-OS film.

An oxide semiconductor layer containing the CAAC-OS is used for a channel formation layer, whereby variations in electrical characteristics of a field-effect transistor due to irradiation with visible light or ultraviolet light can be suppressed. Thus, the transistor has high reliability.

The oxide semiconductor layer can be formed by a sputtering method or the like. In the case where the oxide semiconductor layer is formed by a sputtering method, the relative density (the fill rate) of a metal oxide target to be used is preferably greater than or equal to 90% and less than or equal to 100%, more preferably greater than or equal to 95% and less than or equal to 99.9%. With the use of a metal oxide target with a high relative density, a dense oxide semiconductor layer can be formed. For example, in the case where an In—Ga—Zn metal film is formed as an oxide semiconductor layer, a metal oxide target containing In, Ga, and Zn at an atomic ratio of 3:1:2 can be used as a target.

In addition, the oxide semiconductor layer that has just been formed is preferably supersaturated with oxygen so that the amount of oxygen contained in the oxide semiconductor layer is higher than that in the stoichiometric composition. For example, in the case where the oxide semiconductor layer is formed by a sputtering method, deposition is preferably performed under the condition where the proportion of oxygen in a deposition gas is high, in particular, in a 100% oxygen gas atmosphere. This is because, for example, an effect of suppressing release of Zn from the oxide semiconductor can be obtained in a 100% oxygen gas atmosphere even when the deposition temperature is higher than or equal to 300° C.

Further, it is preferable to remove an impurity such as hydrogen, water, a hydroxyl group, or hydride (also referred to as a hydrogen compound) in the oxide semiconductor layer by dehydration treatment and/or dehydrogenation treatment and supply oxygen to the oxide semiconductor layer in a process of manufacturing the transistor 110. By such treatment, the oxide semiconductor layer can be highly purified. As treatment for high purification, for example, treatment in which an insulating layer containing excess oxygen is formed so as to be in contact with the oxide semiconductor layer, heat treatment, treatment in which oxygen is introduced into the oxide semi conductor layer, or the like can be given.

When the semiconductor layer 350 is a highly purified oxide semiconductor layer, the leakage current of the transistor 110 can be less than or equal to 10 aA/μm. This is because in a highly purified oxide semiconductor, an impurity such as moisture or hydrogen which serves as an electron donor (donor) is reduced and defect levels in an energy gap due to oxygen vacancies are reduced by sufficient supply of oxygen.

It is preferable that moisture remaining in a film formation chamber be as little as possible for high purification of the oxide semiconductor layer. An entrapment vacuum pump is preferably provided as an evacuation unit in a film formation apparatus of the oxide semiconductor layer, and the entrapment vacuum pump may be provided with a cold trap.

As an insulating layer containing excess oxygen, which is used for high purification of the oxide semiconductor layer, $SiO_X$ (X>2) and the like can be given. In order to form an insulating layer containing excess oxygen, film formation conditions in for example, a PECVD method or a sputtering method, can be set as appropriate so that a large amount of oxygen can be contained in the insulating layer. In order to increase the amount of excess oxygen contained in the insulating layer, oxygen may be added to the insulating layer by an ion implantation method, an ion doping method, or plasma treatment.

Heat treatment may be performed in a reduced-pressure atmosphere or an inert gas atmosphere of nitrogen, a rare gas, or the like. A heating temperature can be higher than or equal to 250° C. and lower than or equal to 750° C. and is preferably higher than or equal to 400° C. Of course, the heating temperature is lower than the strain point of the substrate.

There is no particular limitation on a heat treatment apparatus, and an electric furnace or an a rapid thermal annealing (RTA) apparatus such as a gas rapid thermal annealing (GRTA) apparatus or a lamp rapid thermal annealing (LRTA) apparatus may be used.

For example, in the case where heat treatment is performed with a GRTA apparatus, the following step may be performed: the substrate is put in an inert gas heated at high temperature of 650° C. to 700° C., is heated for several minutes, and is taken out of the inert gas. In the case where heat treatment is performed with an electric furnace, for example, heat treatment is performed at 450° C. in a nitrogen atmosphere for 1 hour.

Further, after heat treatment is performed in a reduced-pressure atmosphere or an atmosphere of an inert gas such as nitrogen or a rare gas, the following step may be performed additionally: the atmosphere is changed to an atmosphere of an oxygen gas, a dinitrogen monoxide gas, or ultra-dry air in a state where the temperature of a treatment chamber is maintained or a state where the temperature of the treatment chamber is being lowered. Here, "ultra-dry air" refers to air with a moisture amount of less than or equal to 20 ppm (−55° C. by conversion into a dew point) in the case where measurement is performed with use of a dew point meter of a cavity ring down laser spectroscopy (CRDS) system. The amount of moisture in ultra-dry air is preferably less than or equal to 1 ppm, more preferably less than or equal to 10 ppb. Further, high-purity gas is used as the oxygen gas and the di nitrogen monoxide gas described above, and the purity is preferably higher than or equal to 6N, more preferably higher than or equal to 7N. In other words, it is preferable to use an oxygen gas or a dinitrogen monoxide gas which has an impurity concentration lower than or equal to 1 ppm, preferably lower than or equal to 0.1 ppm.

By heat treatment in a reduced-pressure atmosphere or an atmosphere of an inert gas, the amount of oxygen in the oxide semiconductor layer might be reduced; however, when the atmosphere of the heat treatment is changed, oxygen can be supplied to the oxide semiconductor layer by the action of oxygen or di nitrogen monoxide. In other words, by heat treatment as described above, the oxide semiconductor layer can be highly purified and become i-type (intrinsic).

Note that the heat treatment for the dehydration or dehydrogenation may be performed a plurality of times. Further, the heat treatment described above can also serve as heat treatment in another step and may be performed on the semiconductor layer 350 in subsequent steps after the film formation of the oxide semiconductor layer.

By the dehydration or dehydrogenation treatment, the amount of oxygen which is a main constituent material of an oxide semiconductor may also be reduced. Therefore, oxygen (which includes at least one of an oxygen radical, an oxygen atom, and an oxygen ion) may be added to the oxide semiconductor layer which has been subjected to the dehydration or dehydrogenation treatment to supply oxygen to the oxide semiconductor layer. In order to reduce defect levels due to oxygen vacancies, it is preferable that the oxide semiconductor layer be sufficiently supplied with oxygen and supersaturated with oxygen so that the proportion of oxygen is higher than that in the stoichiometric composition.

When the semiconductor layer 350 is a highly purified oxide semiconductor layer, the transistor 110 with small leakage current can be formed. The smaller the leakage current of the transistor 110 is, the better. The leakage current is preferably lower than or equal to 1 aA/μm ($1\times10^{-18}$ A/μm), more preferably lower than or equal to 1 zA/μm ($1\times10^{-21}$ A/μm), most preferably lower than or equal to 1 yA/μm ($1\times10^{-24}$ A/μm). This can be achieved in such a manner that in the process of forming the transistor 110, the semiconductor layer 350 is made to be an oxide semiconductor layer in which carrier generation sources are extremely reduced by thorough removal of hydrogen from the oxide semi conductor layer which forms the semi conductor layer 350 and sufficient supply of oxygen.

Although FIG. 10 illustrates the configuration example of the pixel 20 which is manufactured using an SOI semiconductor substrate, the pixel 20 can also be manufactured using a bulk semiconductor substrate. In the case where the pixel 50 is manufactured by application of this embodiment, the transistor 150 is preferably manufactured using an oxide semiconductor layer in a manner similar to that of the transistor 110.

[Example 1]

An image sensor of Embodiment 2 (see FIG. 8, FIG. 9, and the like) was manufactured, and its operation was confirmed. In this example, description thereof is made.

<Specification of Image Sensor>

Table 1 shows a main specification of the image sensor 2 which was manufactured.

TABLE 1

| Specification | |
|---|---|
| Image capture method | Global shutter method |
| Imaging area | 8.0 mm(H) × 6.0 mm(V) |
| Resolution | 200(H) × 150(V) |
| Pixel size | 40 μm(H) × 40 μm(V) |
| ADC | Single slope type 6 bit |
| Frame rate | 60 fps |
| Storage capacity | 1 frame imaging data |

Figure 11A:
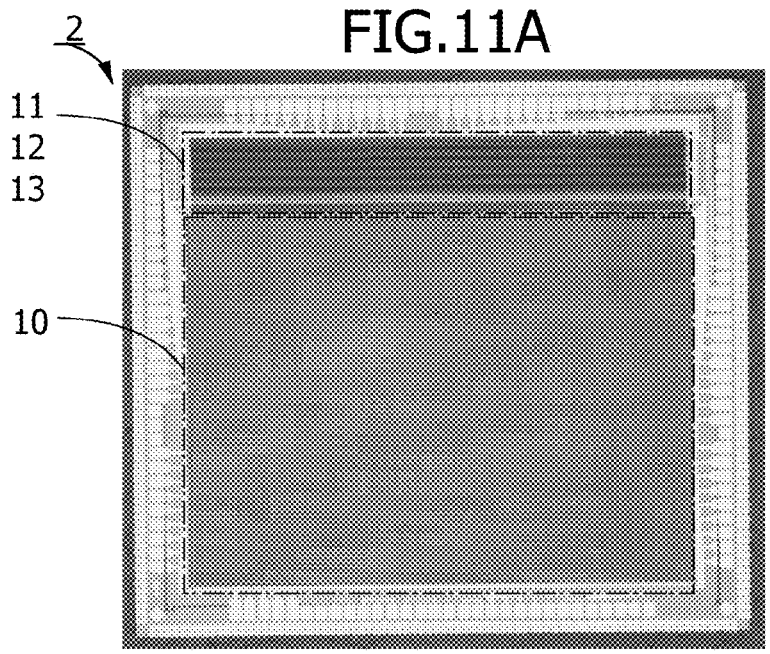
FIG. 11A is a photograph showing a top surface of an image sensor.
Figure 11B:
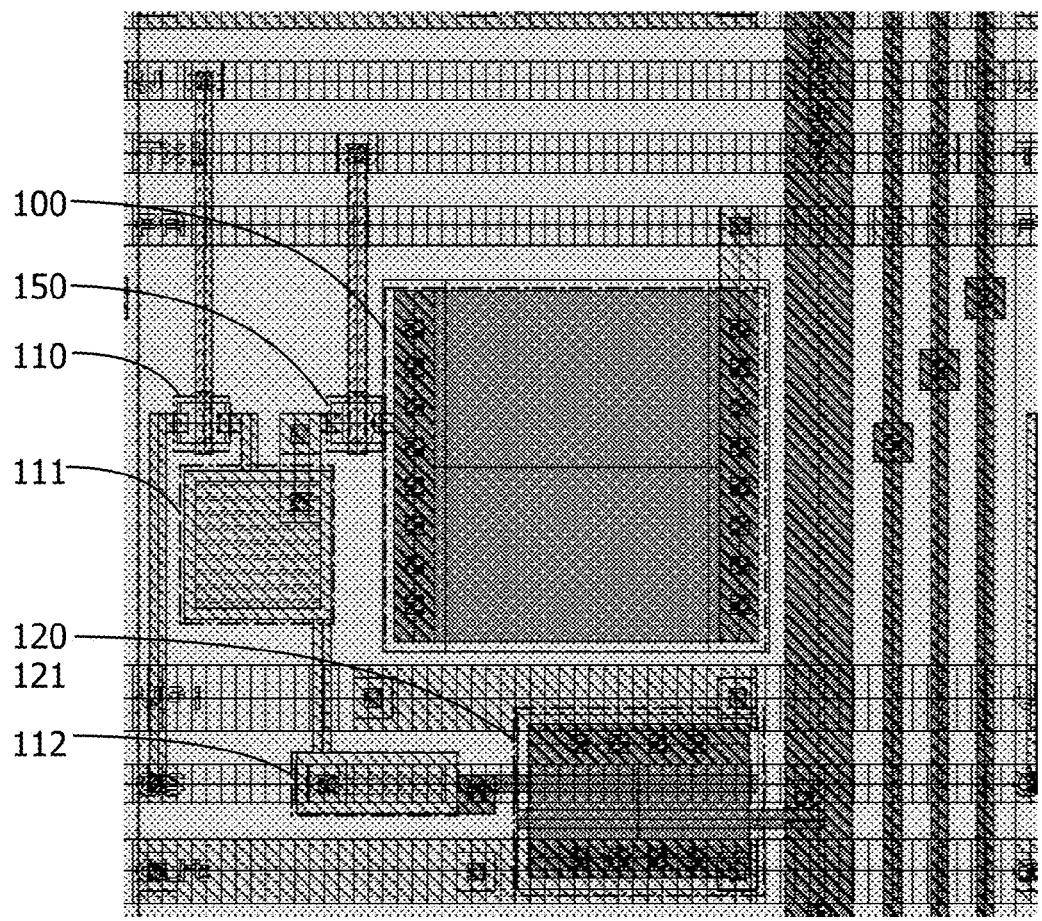
FIG. 11B is a layout diagram of a pixel.

FIG. 11A shows a photograph of a top surface of a chip of the image sensor 2. FIG. 11B is a layout view of the pixel 50 of the image sensor 2. Note that in FIG. 11B, some of the reference numerals shown in FIG. 8 are shown. A design specification of elements in FIG. 11B is described below.

The transistor 110 and the transistor 150 are each manufactured using an oxide semi conductor. The channel lengths L are each 0.8 μm, and the channel widths W are each 0.8 μm. The transistor 120 and the transistor 121 are manufactured using an SOI substrate including a single crystal silicon layer. The channel lengths L are each 0.8 μm, and the channel widths W are each 10 μm. The size of the capacitor 111 is 33.06 μm$^2$ and the capacitance value thereof is 40 fF. The size of the capacitor 112 is 11.57 μm$^2$ and the capacitance value thereof is 14 fF.

As described in Embodiment 2, the image sensor 2 has a function of storing imaging data as an analog value in the pixel array 10. Further, the image sensor 2 has a function of outputting difference data (an analog value) between the imaging data stored in the pixel array 10 and imaging data which is being taken from the pixel array 10. Further, the image sensor 2 can take an image by a global shutter method. In a global shutter method, all the rows of the pixel array 10 are subjected to light exposure at the same time, and after that, image data is sequentially read row by row, and thus image data of one frame is obtained. Accordingly, a global shutter method has an advantage in that an object that moves at high speed can be taken without distortion. Accordingly, the image sensor 2 is very suitable for taking an image of an object which moves at high speed, for example, a surveillance camera for a collision-avoidance device of a car, or the like.

\<Difference Image\>

In order to confirm the function of the image sensor 2, a display of a stopwatch was taken. First, a function of generating a difference image (Imaging Mode 3 in FIG. 9), which is one of the functions of the image sensor 2, is described with reference to FIGS. 12A and 12B. FIG. 12A shows a difference image generated by the image sensor 2, and FIG. 12B is a schematic view of a method for generating the difference image of FIG. 12A.

FIG. 12A shows a difference image between an image stored in the pixel array 10 (digital number 21) and an image which is being taken in real time (digital number 14). In the image of FIG. 12A, segments which are common to display of the digital number 21 and the digital number 14 are not seen. In other words, it was confirmed that the image sensor 2 had a function of generating a difference image in the pixel array 10. Further, it was confirmed that the image sensor 2 was able to generate the difference image in real time.

\<Holding of Imaging Data\>

A function of holding imaging data in the pixel array 10 was confirmed. FIGS. 13A to 13D show results thereof.

The display of the stopwatch was taken and its imaging data was held in the pixel array 10 (Imaging Modes 1 and 2, FIG. 13A). The display of the stopwatch was taken right after the holding in a state where light does not enter from the periphery, and difference data between its imaging data and the stored imaging data was obtained (Imaging Mode 3, FIG. 13B). The pixel array 10 was not rewritten for about five days and the difference data was held (FIG. 13C). FIG. 13D is a graph showing change in the difference image with respect to a data holding period. FIG. 13D shows change over time in the image data corresponding to the numbers (segments) of the stopwatch and image data corresponding to a background. The vertical axis of FIG. 13D indicates a digital output value (ADC code) from the ADC 30.

It was confirmed from FIGS. 13A to 13D that no significant deterioration in the image data held in the image sensor 2 was observed even after the five days. It was thus confirmed that the image sensor 2 had a function of holding imaging data in the pixel array 10 for a long period without deterioration in quality.

This application is based on Japanese Patent Application serial no. 2012-042657 filed with Japan Patent Office on Feb. 29, 2012, the entire contents of which are hereby incorporated by reference.

What is claimed is:

1. An image sensor comprising:
a vertical signal line;
a pixel electrically connected to the vertical signal line; and
an analog-digital conversion device electrically connected to the vertical signal line,
wherein the pixel includes a photodiode, a first capacitor, a first transistor, a second transistor, a third transistor, a first wiring, a second wiring, a third wiring, and a fourth wiring,
wherein one electrode of the first capacitor is electrically connected to an anode of the photodiode,
wherein the other electrode of the first capacitor is electrically connected to a gate of the second transistor,
wherein a node between the other electrode of the first capacitor and the gate of the second transistor is configured to store a potential corresponding to an amount of electric charge generated in the photodiode,
wherein a gate of the first transistor is electrically connected to the first wiring,
wherein one of a source and a drain of the first transistor is electrically connected to the node, and the other of the source and the drain of the first transistor is electrically connected to the third wiring,
wherein one of a source and a drain of the second transistor is electrically connected to one of a source and a drain of the third transistor,
wherein a gate of the third transistor is electrically connected to the second wiring,
wherein the analog-digital conversion device includes a comparator to which a first or second reference potential is input and which compares the first or second reference potential with an analog signal input through the vertical signal line; and a counter which measures a period during which comparison operation is performed by the comparator and holds a measurement result thereof as a digital value,
wherein, the counter is configured to hold an N-bit digital value (N is an integer of 3 or more) as the measurement result when the comparator performs comparison operation using the first reference potential, and
wherein the counter is configured to hold an M-bit digital value (M is an integer of 2 or more and less than N) as the measurement result when the comparator performs comparison operation using the second reference potential.

2. The image sensor according to claim 1, wherein the other of the source and the drain of the second transistor is electrically connected to the fourth wiring, and the other of the source and the drain of the third transistor is electrically connected to the vertical signal line.

3. The image sensor according to claim 2, wherein the pixel further includes a second capacitor one electrode of which is connected to the node and the other electrode of which is set to a constant potential.

4. The image sensor according to claim 2, wherein the first transistor includes an oxide semi conductor layer.

5. The image sensor according to claim 2, wherein the pixel further includes a fourth transistor which controls electrical conduction between the anode of the photodiode and the one electrode of the first capacitor.

6. A camera comprising the image sensor according to claim 2.

7. A camera comprising:
the image sensor according to claim 2; and
a motion determination portion which determines whether an image taken by the image sensor has motion or not based on the M-bit digital value.

8. A surveillance system comprising:
the camera according to claim 7;
a memory device which stores an output of the camera;
a display device which displays the output of the camera; and
a management device which manages the camera, the memory device, and the display device.

9. The image sensor according to claim 1, wherein the other of the source and the drain of the second transistor is electrically connected to the vertical signal line, and the other of the source and the drain of the third transistor is electrically connected to the fourth wiring.

10. The image sensor according to claim 9, wherein the pixel includes a second capacitor one electrode of which is connected to the node and the other electrode of which is set to a constant potential.

11. The image sensor according to claim 9, wherein the first transistor includes an oxide semiconductor layer.

12. The image sensor according to claim 9, wherein the pixel includes a fourth transistor which controls electrical conduction between the anode of the photodiode and the one electrode of the first capacitor.

13. A camera comprising the image sensor according to claim 9.

14. A camera comprising:
the image sensor according to claim 9; and
a motion determination portion which determines whether an image taken by the image sensor has motion or not from the M-bit digital value.

15. A surveillance system comprising:
the camera according to claim 14;
a memory device which stores an output of the camera;
a display device which displays the output of the camera; and
a management device which manages the camera, the memory device, and the display device.

16. A method for driving an image sensor:
the image sensor including:
a pixel, a vertical signal line and a signal processing circuit which is configured to convert an analog signal output from the pixel through the vertical signal line into a digital signal,
wherein the pixel includes a capacitor; a photoelectric conversion element electrically connected to one electrode of the capacitor; an amplifier circuit electrically connected to the other electrode of the capacitor, the amplifier circuit configured to output an analog signal corresponding to a potential of a node between the other electrode of the capacitor and the amplifier circuit; a first switch which controls electrical conduction between the amplifier circuit and the vertical signal line; and a circuit which resets the potential of the node:
the method for driving the image sensor comprising:
a first step of accumulating electric charge in the photoelectric conversion element while the node is an electrically floating state;
a second step of reading the analog signal corresponding to the potential of the node in the first step through the vertical signal line and converting the analog signal into an N-bit digital signal (N is an integer of 3 or more) in the signal processing circuit;
a third step of accumulating electric charge in the photoelectric conversion element while the potential of the node is fixed, and then bringing the node into an electrically floating state;
a fourth step, after the third step, of accumulating electric charge in the photoelectric conversion element while the node is maintained in an electrically floating state; and
a fifth step of reading the analog signal corresponding to the potential of the node in the fourth step through the vertical signal line and converting the analog signal into an M-bit digital signal (M is an integer of 2 or more and less than N) in the signal processing circuit.

17. The method for driving an image sensor according to claim 16, further comprising a sixth step of determining whether an image taken by the image sensor has motion or not based on the M-bit digital signal,
wherein which of the first step and the third step is performed next is determined in accordance with a determination result of the sixth step.

18. A method for driving an image sensor:
the image sensor including:
a pixel, a vertical signal line and a signal processing circuit which is configured to convert an analog signal output from the pixel through the vertical signal line into a digital signal,
wherein the pixel includes a capacitor; a photoelectric conversion element electrically connected to one electrode of the capacitor; an amplifier circuit electrically connected to the other electrode of the capacitor, the amplifier circuit configured to output an analog signal corresponding to a potential of a node between the other electrode of the capacitor and the amplifier circuit; a first switch which controls electrical conduction between the amplifier circuit and the vertical signal line; a circuit which resets the potential of the node by supplying a constant potential to the node; and a second switch which controls electrical conduction between the photoelectric conversion element and the other electrode of the capacitor:
the method for driving the image sensor comprising:
a first step of accumulating electric charge in the photoelectric conversion element in a state where the second switch is turned on and then turning off the second switch, while the node is maintained in an electrically floating state;
a second step of reading the analog signal corresponding to the potential of the node in the first step through the vertical signal line and converting the analog signal into an N-bit digital signal (N is an integer of 3 or more) in the signal processing circuit;
a third step of accumulating electric charge in the photoelectric conversion element in the state where the second switch is turned on and then turning off the second switch while the potential of the node is fixed, and then bringing the node into an electrically floating state;
a fourth step, after the third step, of accumulating electric charge in the photoelectric conversion element in the state where the second switch is turned on and then turning off the second switch while the node is maintained in an electrically floating state; and
a fifth step of reading the analog signal corresponding to the potential of the node in the fourth step through the vertical signal line and converting the analog signal into an M-bit digital signal (M is an integer of 2 or more and less than N) in the signal processing circuit.

19. The method for driving an image sensor, according to claim 18, further comprising a sixth step of determining whether an image taken by the image sensor has motion or not based on the M-bit digital signal,
wherein which of the first step and the third step is performed next is determined in accordance with a determination result of the sixth step.

* * * * *

UNITED STATES PATENT AND TRADEMARK OFFICE
CERTIFICATE OF CORRECTION

PATENT NO.         : 9,131,171 B2
APPLICATION NO.    : 13/772663
DATED              : September 8, 2015
INVENTOR(S)        : Takeshi Aoki et al.

It is certified that error appears in the above-identified patent and that said Letters Patent is hereby corrected as shown below:

In the Specification

At column 1, line 19, "semi conductor" should be --semiconductor--;

At column 1, line 20, "semi conductor" should be --semiconductor--;

At column 2, line 29, "semi conductor" should be --semiconductor--;

At column 2, line 30, "semi conductor." should be --semiconductor.--;

At column 2, lines 31-32, "semi conductor" should be --semiconductor--;

At column 2, line 32, "semi conductor" should be --semiconductor--;

At column 3, line 18, "dun ng" should be --during--;

At column 4, line 47, "sane" should be --same--;

At column 5, line 17, "anal og-digital" should be --analog-digital--;

At column 7, line 46, "(Imagi ng" should be --(Imaging--;

At column 8, line 4, "V PD" should be --VPD--;

At column 8, line 25, "vales" should be --varies--;

At column 8, line 41, "Model." should be --Mode 1.--;

At column 8, line 56, "N pd" should be --Npd--;

At column 9, line 10, "Vm≈VMEM-ΔVpd" should be --Vm ≒ VMEM-ΔVpd--;

At column 9, line 22, "Vm≈VMEM-ΔVpd" should be --Vm ≒ VMEM-ΔVpd--;

At column 10, line 49, "real" should be --read--;

At column 13, line 29, "FIR" should be --PTR--;

At column 14, line 1, "100 f F," should be --100 fF,--;

At column 14, line 44, "301" should be --SOI--;

At column 14, line 45, "301" should be --SOI--;

Signed and Sealed this
Twenty-second Day of March, 2016

Michelle K. Lee
*Director of the United States Patent and Trademark Office*

CERTIFICATE OF CORRECTION (continued)
U.S. Pat. No. 9,131,171 B2

At column 14, line 46, "301" should be --SOI--;

At column 14, line 52, "301" should be --SOI--;

At column 14, line 57, "semi conductor" should be --semiconductor--;

At column 15, line 14, "sane" should be --same--;

At column 15, line 50, "semi conductor" should be --semiconductor--;

At column 15, line 51, "semi conductor," should be --semiconductor,--;

At column 16, line 4, "lanthanoid" should be --lanthanoid--;

At column 16, line 26, "crystal line" should be --crystalline--;

At column 16, line 26, "semi conductor" should be --semiconductor--;

At column 16, line 35, "crystal line" should be --crystalline--;

At column 16, line 35, "semi conductor)." should be --semiconductor).--;

At column 16, line 60, "semi conductor." should be --semiconductor.--;

At column 16, line 62, "semi conductor," should be --semiconductor,--;

At column 16, line 63, "semi conductor," should be --semiconductor,--;

At column 16, line 65, "semi conductor," should be --semiconductor,--;

At column 16, line 66, "semi conductor," should be --semiconductor,--;

At column 17, line 34, "pats," should be --parts,--;

At column 17, line 40, "pats" should be --parts--;

At column 17, line 44, "pats" should be --parts--;

At column 17, line 50, "pats" should be --parts--;

At column 17, line 59, "pats" should be --parts--;

At column 17, line 60, "pats" should be --parts--;

At column 17, line 61, "waxes" should be --c-axes--;

At column 17, line 61, "pats" should be --parts--;

At column 18, line 38, "semi conductor" should be --semiconductor--;

At column 19, line 30, "di nitrogen" should be --dinitrogen--;

At column 19, line 42, "di nitrogen" should be --dinitrogen--;

At column 20, line 7, "semi conductor" should be --semiconductor--;

At column 20, line 8, "semi conductor" should be --semiconductor--;

At column 20, line 43, "semi conductor." should be --semiconductor.--;

In the Claims

In claim 4, column 22, line 35, "semi conductor" should be --semiconductor--.